United States Patent
Culbert et al.

(10) Patent No.: US 8,942,764 B2
(45) Date of Patent: Jan. 27, 2015

(54) PERSONAL MEDIA DEVICE CONTROLLED VIA USER INITIATED MOVEMENTS UTILIZING MOVEMENT BASED INTERFACES

(75) Inventors: Michael Culbert, Monte Sereno, CA (US); Scott Forstall, Mountain View, CA (US); Nicholas V. King, San Jose, CA (US); Michael M. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 823 days.

(21) Appl. No.: 11/906,197

(22) Filed: Oct. 1, 2007

(65) Prior Publication Data
US 2009/0088204 A1 Apr. 2, 2009

(51) Int. Cl.
*H04M 1/00* (2006.01)
*G06F 3/01* (2006.01)
*G06F 3/0346* (2013.01)

(52) U.S. Cl.
CPC .............. *G06F 3/017* (2013.01); *G06F 3/0346* (2013.01); *G06F 2200/1637* (2013.01); *G06F 2203/0381* (2013.01)
USPC ........ 455/556.1; 345/156; 345/163; 345/173; 709/238; 398/154

(58) Field of Classification Search
CPC .. H04M 2250/12; G06F 1/1694; G06F 3/017; G06F 1/1626; H04W 4/043
USPC ................................ 455/556.1; 345/158, 169
See application file for complete search history.

(56) References Cited

U.S. PATENT DOCUMENTS

| | | | |
|---|---|---|---|
| 6,411,198 B1 * | 6/2002 | Hirai et al. | 340/7.6 |
| 7,194,445 B2 | 3/2007 | Chan et al. | |
| 7,301,529 B2 * | 11/2007 | Marvit et al. | 345/156 |
| 7,688,306 B2 | 3/2010 | Wehrenberg et al. | |
| 7,763,842 B2 | 7/2010 | Hsu et al. | |
| 2001/0012802 A1 | 8/2001 | Nishiumi et al. | |
| 2002/0015024 A1 * | 2/2002 | Westerman et al. | 345/173 |
| 2002/0167699 A1 * | 11/2002 | Verplaetse et al. | 359/158 |
| 2005/0212767 A1 | 9/2005 | Marvit et al. | |
| 2006/0085558 A1 * | 4/2006 | Solomon | 709/238 |
| 2006/0155914 A1 | 7/2006 | Jobs et al. | |
| 2006/0223588 A1 | 10/2006 | Hsi | |
| 2006/0250377 A1 | 11/2006 | Zadesky et al. | |
| 2007/0038941 A1 | 2/2007 | Wysocki et al. | |
| 2007/0050597 A1 | 3/2007 | Ikeda | |
| 2007/0072674 A1 | 3/2007 | Ohta et al. | |

(Continued)

FOREIGN PATENT DOCUMENTS

| | | |
|---|---|---|
| EP | 0872994 A1 | 10/1998 |
| TW | 200704920 | 2/2007 |
| WO | WO-2005103863 A2 | 11/2005 |

OTHER PUBLICATIONS

PCT Invitation to Pay/Partial International Search (dated Jul. 6, 2009), International Application No. PCT/US2008/010929, International Filing Date—Sep. 19, 2008, (5 pages).

(Continued)

*Primary Examiner* — Gerald Johnson
(74) *Attorney, Agent, or Firm* — Brownstein Hyatt Farber Schreck, LLP

(57) ABSTRACT

Systems and methods are provided for a media device including one or more movement-based interfaces for interfacing with or controlling the media device.

22 Claims, 18 Drawing Sheets

(56) References Cited

U.S. PATENT DOCUMENTS

2007/0124680 A1    5/2007  Robbin et al.
2007/0152966 A1*   7/2007  Krah et al. .................... 345/163
2008/0280642 A1*  11/2008  Coxhill et al. ............ 455/556.1
2008/0284739 A1*  11/2008  Andrews et al. ............. 345/173

OTHER PUBLICATIONS

PCT International Search Report and Written Opinion (dated Sep. 25, 2009), International Application No. PCT/US2008/010929, International Filing Date—Sep. 19, 2008, (19 pages).

"Unified Media-Bar", Live Pictures of the Sony Ericsson W910i from Sep. 21, 2007, Internet article at: http://www.inside-handy.de/news/9824-drucken.html (with Google Translate page), (2 pages).

CN Third Office Action (dated Mar. 12, 2012), Application No. 200810168080,6, Date Filed—Sep. 27, 2008, (12 pages).

CN Second Office Action (dated Jul. 6, 2011), Application No. 200810168080.6, Date Filed—Sep. 27, 2008, (7 pages).

CN First Office Action (dated Nov. 5, 2010), Application No. 200810168080.6, Date Filed—Sep. 27, 2008, (8 pages).

CN Fourth Office Action (dated Sep. 27, 2012), Application No. 200810168080.6, Date Filed—Sep. 27, 2008, (12 pages).

Office Action for DE 10 2008 049 653.7 dated Jul. 9, 2013 with English Translation.

KIPO's Notice of Last Preliminary Rejection (dated Sep. 27, 2012), Application No. 10-2010-7009743, Date Filed—Sep. 19, 2008, (11 pages).

TW Patent Application No. 097137543—Office Action dated Jan. 14, 2013.

European Patent Application No. 08835104.4 Examination Report dated Jan. 23, 2013.

* cited by examiner

PERSONAL MEDIA DEVICE CONTROLLED VIA USER INITIATED MOVEMENTS UTILIZING MOVEMENT BASED INTERFACES

BACKGROUND

This invention relates to personal media devices and, more particularly, to movement-based interfaces for personal media devices.

The proliferation of compact portable personal media devices (e.g., portable MP3 players, portable video players, and media capable cellular telephones) has enabled users to interact with such compact portable media devices and access multimedia such a video and audio (e.g., voice and music) while walking, running, driving, or during other activities.

One problem with existing portable media devices such as cellular telephones is that users can become distracted from other activities while interfacing with the media device's video display, graphical user interface (GUI), and/or keypad. For example, a runner may carry a personal media device to listen to music or to send/receive cellular telephone calls while running. In a typical personal media device, the runner must look at the device's display to interact with a media application in order to select a song for playing. Also, the user likely must depress the screen or one or more keys on its keypad to perform the song selection. These interactions with the personal media device can divert the user's attention from her surroundings which could be dangerous, force the user to interrupt her other activities, or cause the user to interfere with the activities of others within her surroundings. Accordingly, there is a need for providing a user interface in a personal media device that minimizes either or both a user's physical and visual interactions with the personal media device, especially while the user is performing other activities that require, for example, the user's visual senses.

SUMMARY

The invention, in various embodiments, addresses deficiencies in the prior art by providing systems, methods and devices that enable a personal media device user to control a personal media device via user-initiated movements of the device and/or allows the user to receive motion-based information from the personal media device.

In various aspects, the invention employs a position, orientation, or movement (POM) sensor in a media device. A POM sensor may include, without limitation, an accelerometer, a gyroscope, a light sensor, an infrared (IR) sensor, proximity sensor, capacitive proximity sensor, acoustic sensor, sonic or sonar sensor, radar sensor, image sensor, video sensor, global positional system (GPS) detector, RF detector, RF or acoustic doppler detector, video sensor, compass, magnetometer, or other like environment sensor.

In one aspect, a media device includes at least one sensor that generates a sensor signal based on at least one of a position, orientation, and movement of the media device. The media device also includes a processor that receives the sensor signal and controls one or more operations of the media device based at least in part on the sensor signal. In one configuration, the media device includes a database or data store having one or more known movement patterns where each movement pattern is associated with an operation of the media device. In one feature, the processor compares the sensor signal with the one or more known movement patterns to determine the associated operation of the media device.

The comparing function may include employing a pattern recognition algorithm or technique.

In one configuration, an operation includes stepping through a list of elements associated with an application. The stepping may occur in increments that are proportional to an intensity of at least one of a rate of change in position, a rate of change in orientation, and a rate of movement. An operation may include at least one of starting or launching one or more applications, stopping or ending one or more applications, selecting or de-selecting one or more elements, increasing or decreasing one or more settings, moving through a list of elements, initiating or ending a communications session, playing music or video, pausing music or video, and initiating or ending an audio or video recording session. An element may include at least one of a song, a video, a music file, an audio file, a video file, a photograph, a media file, an application icon, an activation icon, a control button, a data file, and contact data.

In one configuration, the sensor includes at least one accelerometer, gyroscope, compass, IR detector, sonic detector, altimeter, magnetic field detector, RF detector, GPS, light sensor, and doppler detector. In one feature, the generation of a sensor signal may be based on sensing a sequence of at least one of position, orientation, and movement of the media device over a period of time.

In another configuration, the media device includes an activation interface that receives a user input to enable or disable the controlling of the operation of the media device based on the sensor signal. The media device may include at least one of a cellular telephone, a wireless communications device, a media player, an MP3 player, a video player, a PDA, and a portable computer. The media device may include a vibration source that generates one or more vibration patterns. In one configuration, the media device includes a data store of one or more vibration patterns where each vibration pattern is associated with at least one element of an application of the media device. In one feature, the generation of a vibration pattern occurs when an element is selected by a user.

In a further configuration, the media device includes an audio source that generates one or more audio patterns. The media device may include a data store of one or more audio patterns where each audio pattern is associated with at least one element of an application of the media device. In one feature, generation of an audio pattern occurs when an element is selected by a user. In another configuration, the media device includes an input interface for receiving the sensor signal and storing a known movement pattern associated with the sensor signal. The media device may also include a database or data store with a plurality of known combined vibration and audio patterns where each of the combined vibration and audio patterns are associated with an operation and/or element of a the media device.

In one feature, a movement pattern recognition application may be activated by a user by holding the media device, touching the display, pressing an icon on the display, pressing a button on the media device interface, and/or touching a bezel either alone or in combination with a particular movement pattern. In another feature, one or more operations of the media device may be initiated by a user by holding the media device, touching the display, pressing an icon on the display, pressing a button on the media device interface, and/or touching a bezel either alone or in combination with a particular known movement pattern. In certain configurations, by requiring a user to explicitly interact with a portion of the media device (e.g, touching the display, button, icon, and/or bezel) while performing a movement pattern, the possibility of inadvertently initiating a media device operation is minimized or eliminated. A media device application may also be called or activated by another application running on a media device.

A media device may also employ a grip detector or proximity sensor that senses when the phone is in a user's hand so that the media device can ignore changes in position, orientation, or movement that are not based on the user's hand movements and/or positioning, or to enable activation of motion sensing applications. In one feature, the grip detector may include one or more switches and/or buttons to detect the presence of at least one, two, three, and four fingers.

In another aspect, a media device includes a transceiver that sends and receives user communications. The media device may include a movement pattern sensor that senses a movement pattern based at least one of the position, orientation, and movement of the media device. The media device may also include a pattern recognition unit that receives and identifies the movement pattern. In one configuration, the identifying is based at least in part on a statistical model.

In a further aspect, a media device includes a movement pattern sensor that senses a movement pattern or sequence of movement patterns based at least one of the position, orientation, and movement of the media device or changes thereof. The media device may include a pattern recognition unit that receives and identifies the movement pattern. The media device may also include a communications application that provides user-based communications to and from the media device and enables a user to navigate through a contact list of entities associated with the user in response to the identified movement pattern. In one feature, an entity is another person.

Various advantages and applications using movement-based interfaces for a media device in accordance with principles of the present invention are discussed in more detail below.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Figure 1A:
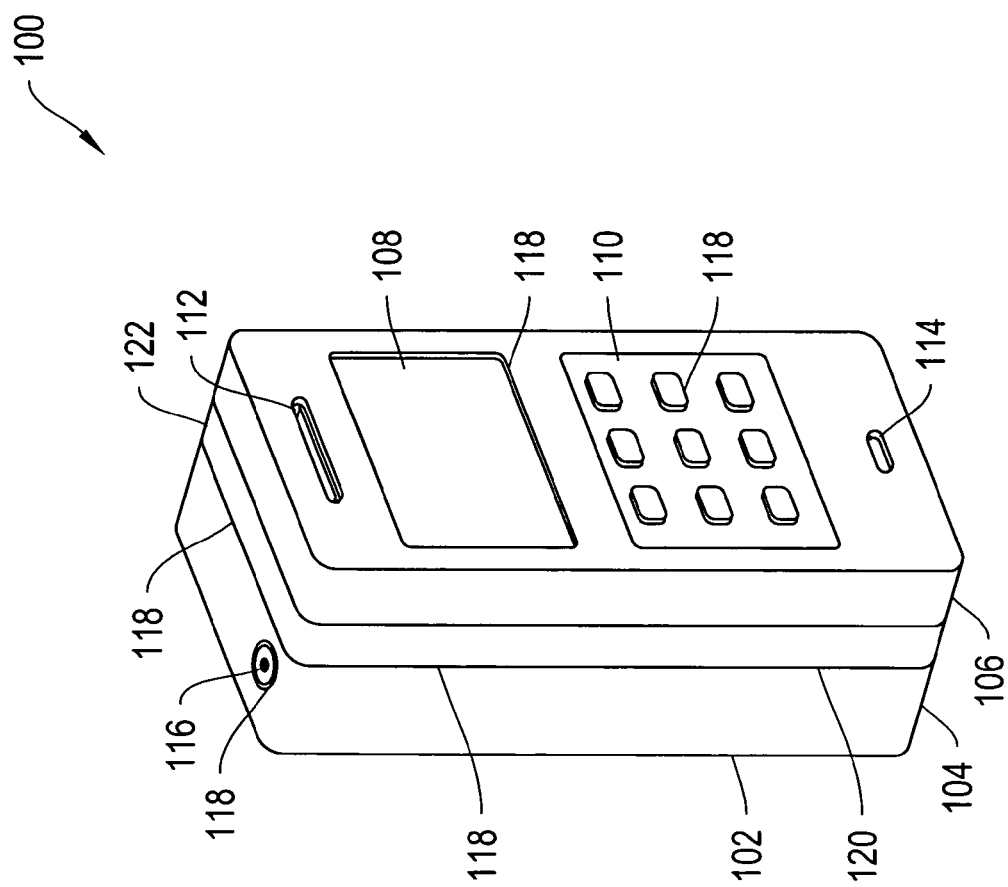
FIG. 1A is a perspective view of a media device with an exposed frame assembly according to an illustrative embodiment of the invention.

FIG. 1A is a perspective view of a media device 100 according to an illustrative embodiment of the invention. The media device 100 includes a housing 102, a first housing portion 104, a second housing portion 106, a display 108, a keypad 110, a speaker housing aperture 112, a microphone housing aperture 114, a headphone jack 116, and frame sidewall 122. Although not shown, in certain embodiments, the frame sidewall 122 is the exposed portion of a frame residing within or adjacent to the housing 102 that provides structural support for the media device 100 and various internal components. The housing 102 also includes various gaps 118 that may include openings, separations, vents, or other pathways between elements of the housing 102 that enable the passage of air or sound through the housing 102.

In one embodiment, the housing 102 includes a first housing portion 104 and a second housing portion 106 that are fastened together to encase various components of the media device 100. In certain embodiments, the housing 102 also includes an exposed frame 120 that provides structural support for the media device 100. The housing 102 and its housing portions 104 and 106 may include polymer-based materials that are formed by, for example, injection molding to define the form factor of the media device 100. In one embodiment, the housing 102 surrounds and/or supports internal components such as, for example, one or more circuit boards having integrated circuit components, internal radio frequency (RF) circuitry, an internal antenna, a speaker, a microphone, a hard drive, a processor, and other components. Further details regarding certain internal components are discussed later with respect to FIG. 3. The housing 102 provides for mounting of a display 108, keypad 110, external jack 116, data connectors, or other external interface elements. The housing 102 may include one or more housing apertures 112 to facilitate delivery of sound, including voice and music, to a user from a speaker within the housing 102. The housing 102 may including one or more housing apertures 114 to facilitate the reception of sounds, such as voice, for an internal microphone from a media device user.

In certain embodiments, the housing 102 includes one or more gaps 118 associated with the housing 102. These gaps 118 may result from the manufacturing and/or assembly process for the media device 100. For example, in certain circumstances, the mechanical attachment of the first housing portion 104 with the second housing portion 106 or the sidewall 122 results in a crease 120 or joint between the portions 104 and 106. In certain media devices 100, the crease 120 is not air tight, resulting in gaps 118 along the crease. Other gaps may be formed during assembly between, for example, one or more keys of the keypad 110 and the housing 102 or the display 108 and the housing 102, resulting in additional gaps 118. In other embodiments, the housing 102 may include addition portions that are integrated to form the housing 102 for the media device 100.

The media device 100 may include a wireless communications device such as a cellular telephone, satellite telephone, cordless telephone, personal digital assistant (PDA), pager, portable computer, or any other device capable of wireless communications. In fact, FIG. 1 shows an exemplary cellular telephone version of a broad category of media device 100.

The media device 100 may also be integrated within the packaging of other devices or structures such a vehicle, video game system, appliance, clothing, helmet, glasses, wearable apparel, stereo system, entertainment system, or other portable devices. In certain embodiments, device 100 may be docked or connected to a wireless enabling accessory system (e.g., a wi-fi docking system) that provides the media device 100 with short-range communicating functionality. Alternative types of media devices 100 may include, for example, a media player such as an iPod or iphone that are made available by Apple Inc., of Cupertino, Calif., pocket-sized personal computers such as an iPAQ Pocket PC available by Hewlett Packard Inc., of Palo Alto, Calif. and any other device capable of communicating wirelessly (with or without the aid of a wireless enabling accessory system).

In certain embodiments, the media device 100 may synchronize with, for example, a remote computing system or server to receive media (using either wireless or wireline communications paths). Wireless syncing enables the media device 100 to transmit and receive media and data without requiring a wired connection. Media may include, without limitation, sound or audio files, music, video, multi-media, and digital data, in streaming and/or discrete (e.g., files and packets) formats.

During synchronization, a host system may provide media to a client system or software application embedded within the media device 100. In certain embodiments, media and/or data is "downloaded" to the media device 100. In other embodiments, the media device 100 is capable of uploading media to a remote host or other client system. Further details regarding the capabilities of certain embodiments of the media device 100 are provided in U.S. patent application Ser. No. 10/423,490, filed on Apr. 25, 2003, the entire contents of which are incorporated herein by reference.

Figure 1B:
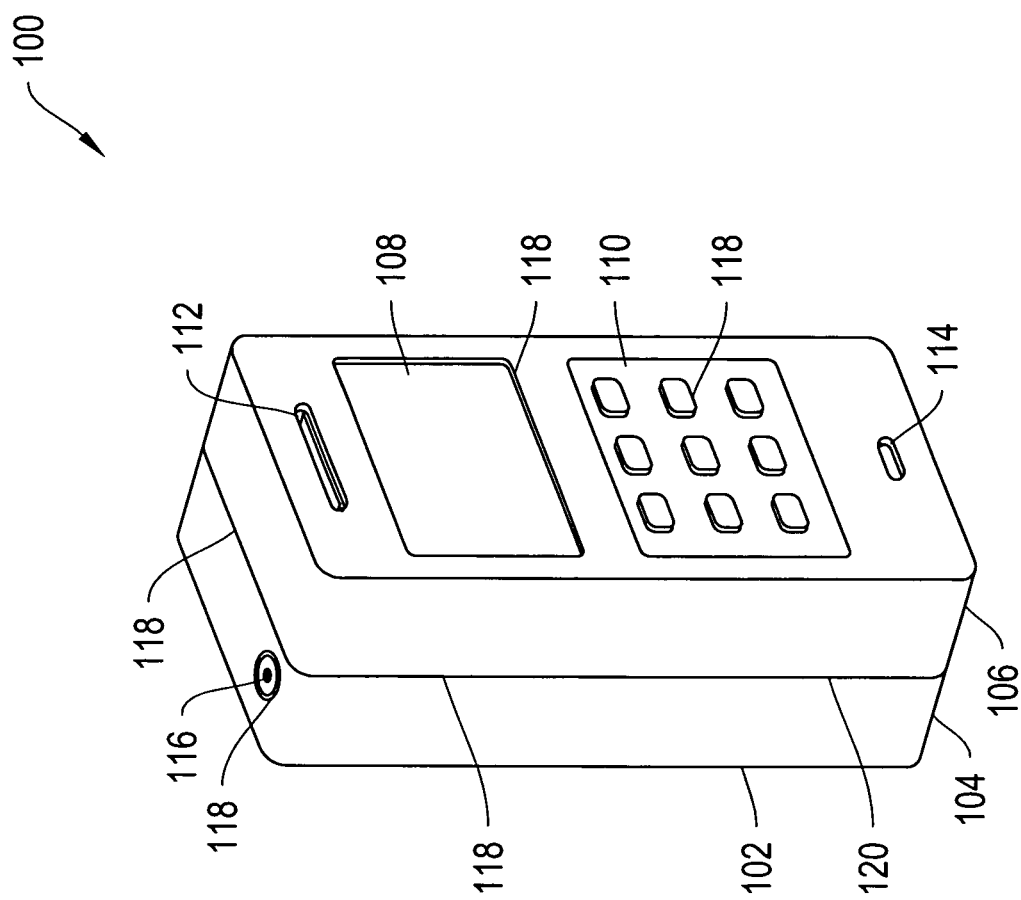
FIG. 1B is another perspective view of a media device according to an illustrative embodiment of the invention.

FIG. 1B is another perspective view of a media device 100 according to an illustrative embodiment of the invention. In this embodiment, as opposed to the embodiment of FIG. 1A, the media device's frame and/or the frame's sidewalls are not exposed to an external surface of the device. However, in certain embodiments, the frame is connected internally with at least a portion of one of the first housing portion 104 or the second housing portion 106.

Figure 2:
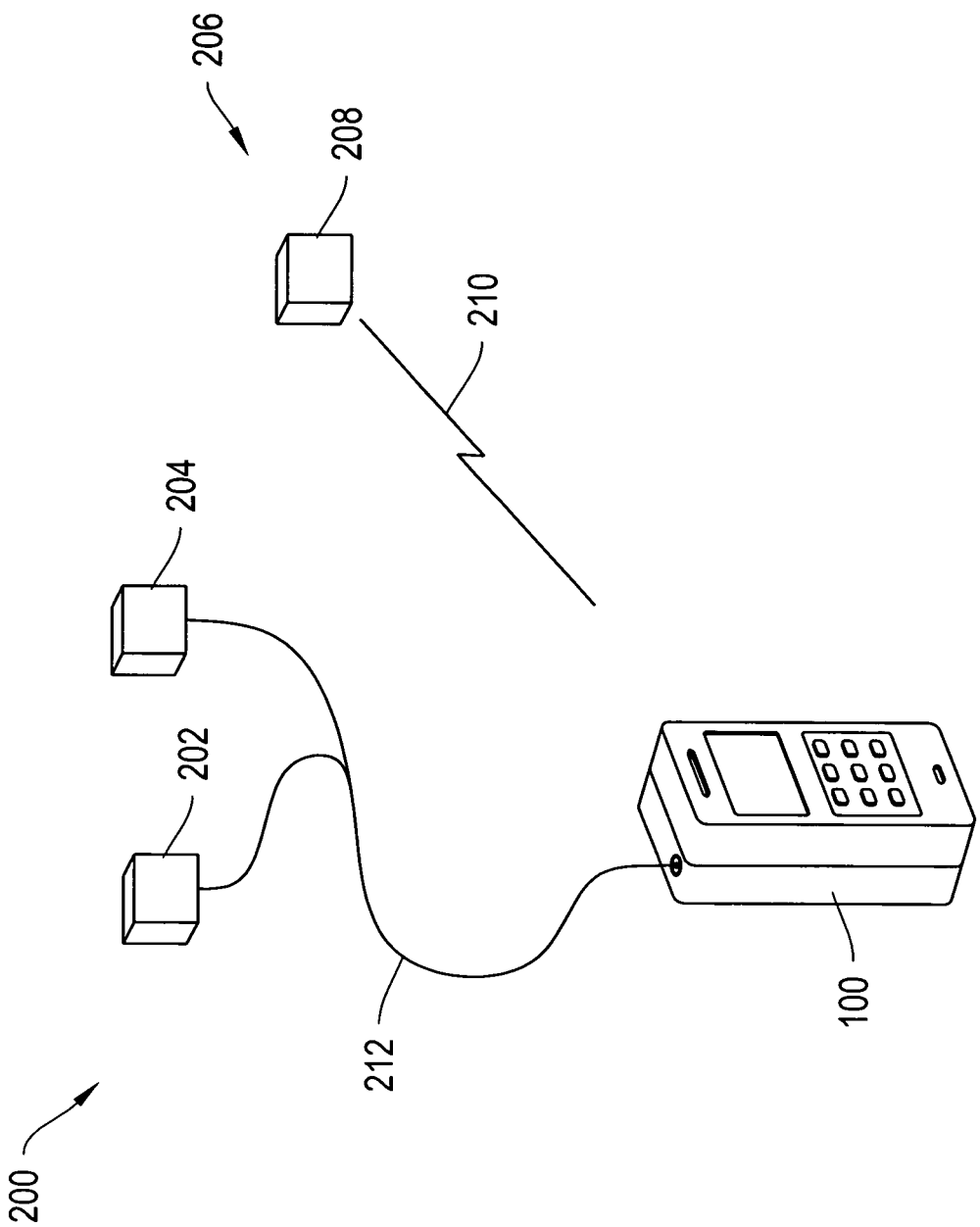
FIG. 2 shows the media device of FIGS. 1A and 1B with tethered headphones and, alternatively, a wireless earpiece according to an illustrative embodiment of the invention.

FIG. 2 shows the media device 100 of FIG. 1 with tethered headphones 200 and, alternatively, a wireless earpiece 206 according to an illustrative embodiment of the invention. The tethered headphones 200 include a cable 212 that connects to the media device 100 via external jack 116. In one embodiment, the cable provides for transport of an audio signal from the media device 100 to the headphones 100. In another embodiment, the headphones 200 includes a left housing 202 and a right housing 204, corresponding to the left and right ears of a user, respectively. Each housing 202 and 204 may include a speaker and/or an acoustic assembly as described later with respect to FIG. 4. The headphones 200 may optionally include a microphone to facilitate sending sounds from the user to the media device 100. As an alternative to the headphones 200, a user may utilize the wireless earpiece 206 which includes a housing 208. In one embodiment, the earpiece 206 employs wireless channel 210 to receive audio signals from the device 100 or transmit audio signals to the device 100. The housing 208 may include a speaker, microphone, and/or acoustic assembly as described later with respect to FIG. 4.

Figure 3:
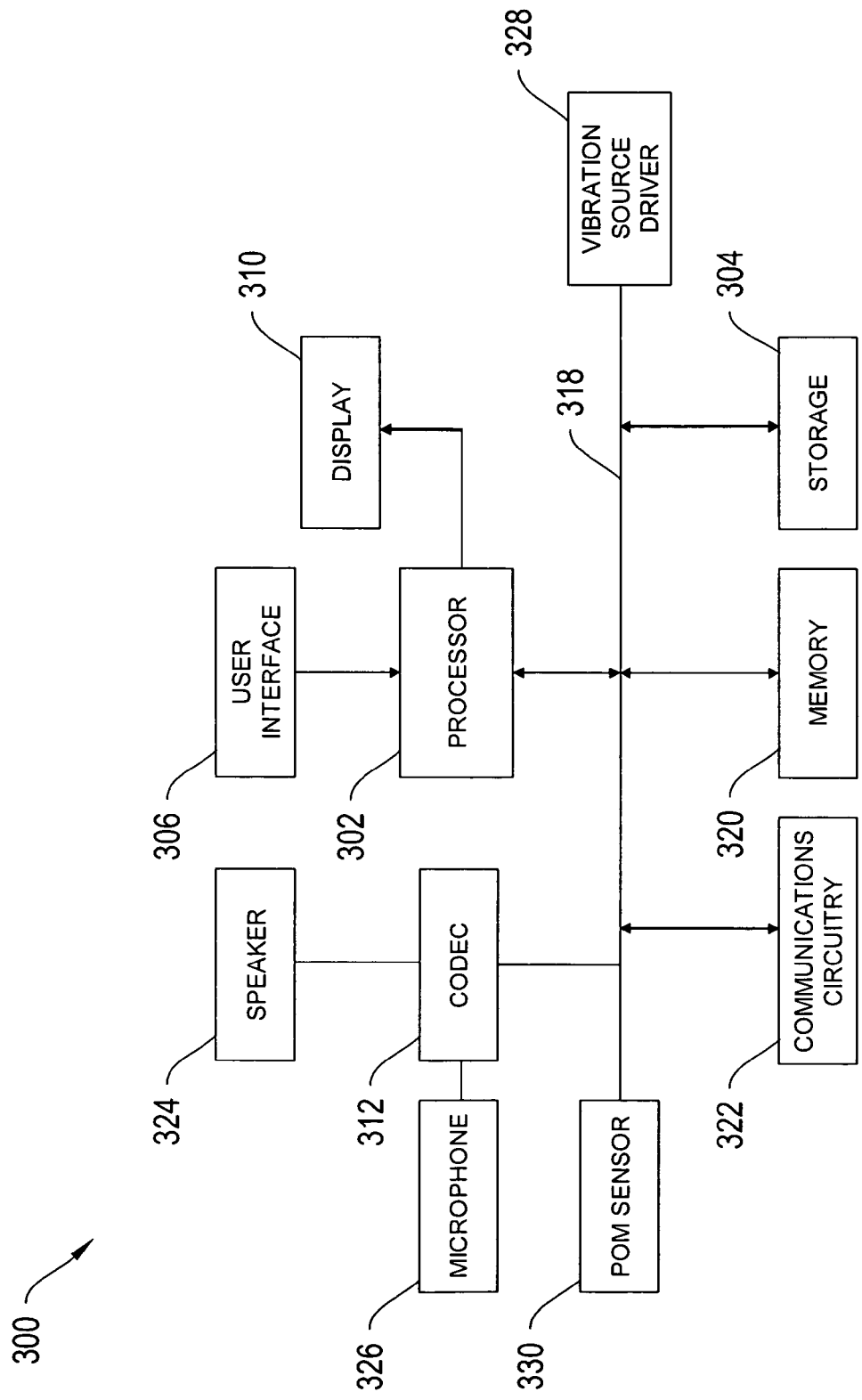
FIG. 3 shows a simplified functional block diagram of a media device according to an illustrative embodiment of the invention.

FIG. 3 shows a simplified functional block diagram of the media device 100 according to an illustrative embodiment of the invention. The media device or player 300 may include a processor 302, storage device 304, user interface 308, display 310, CODEC 312, bus 318, memory 320, communications circuitry 322, a speaker or transducer 324, a microphone 326, a vibration source driver 328, and a POM sensor 330. Processor 302 may control the operation of many functions and other circuitry included in media player 300. Processor 302 may drive display 310 and may receive user inputs from the user interface 308.

Storage device 304 may store media (e.g., music and video files), software (e.g., for implanting functions on device 300, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish wireless communication with another device), subscription information (e.g., information that keeps tracks of podcasts or television shows or other media a user subscribes to), and any other suitable data. Storage device 304 may include one more storage mediums, including for example, a hard-drive, permanent memory such as ROM, semi-permanent memory such as RAM, or cache.

Memory 320 may include one or more different types of memory which may be used for performing device functions. For example, memory 320 may include cache, ROM, and/or RAM. Bus 318 may provide a data transfer path for transferring data to, from, or between at least storage device 304, memory 320, and processor 302. Coder/decoder (CODEC) 112 may be included to convert digital audio signals into an analog signal for driving the speaker 324 to produce sound including voice, music, and other like audio. The CODEC 112 may also convert audio inputs from the microphone 326 into digital audio signals.

User interface 308 may allow a user to interact with the media device 300. For example, the user input device 308 can take a variety of forms, such as a button, keypad, dial, a click wheel, or a touch screen. Communications circuitry 322 may include circuitry for wireless communication (e.g., short-range and/or long range communication). For example, the wireless communication circuitry may be wi-fi enabling circuitry that permits wireless communication according to one of the 802.11 standards. Other wireless network protocols standards could also be used, either in alternative to the identified protocols or in addition to the identified protocol. Other network standards may include Bluetooth, the Global System for Mobile Communications (GSM), and code division multiple access (CDMA) based wireless protocols. Communications circuitry 322 may also include circuitry that enables device 300 to be electrically coupled to another device (e.g., a computer or an accessory device) and communicate with that other device.

In one embodiment, the media device 300 may be a portable computing device dedicated to processing media such as audio and video. For example, media device 300 may be a media player (e.g., MP3 player), a game player, a remote controller, a portable communication device, a remote ordering interface, an audio tour player, or other suitable personal device. The media device 300 may be battery-operated and highly portable so as to allow a user to listen to music, play games or video, record video or take pictures, communicate with others, and/or control other devices. In addition, the media device 300 may be sized such that it fits relatively easily into a pocket or hand of the user. By being handheld, the media device 300 (or media device 100 shown in FIG. 1) is relatively small and easily handled and utilized by its user and thus may be taken practically anywhere the user travels.

As discussed previously, the relatively small form factor of the media devices 300 enables a user to easily manipulate the devices position, orientation, and movement. Accordingly, embodiments of the invention provide for improved techniques of sensing such changes in position, orientation, and movement to enable a user to interface with or control the media device 300 by affecting such changes. Further, the media device 300 may include a vibration source 328, under the control of processor 302, for example, to facilitate sending motion, vibration, and/or movement information to a user related to an operation of the media device.

Figure 4:
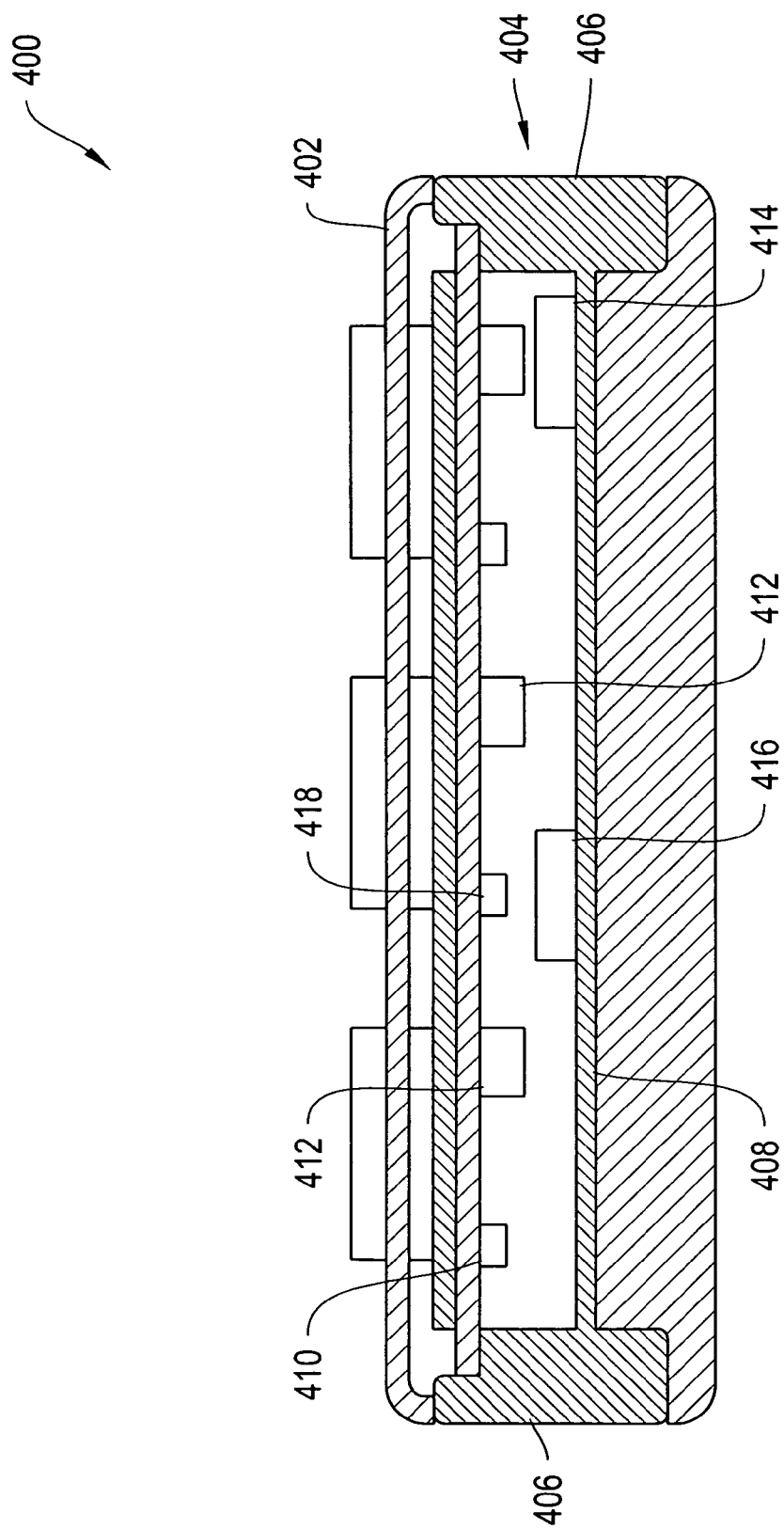
FIG. 4 shows a transverse sectional view of a media device including an vibration source and POM sensor according to an illustrative embodiment of the invention.

FIG. 4 shows a transverse sectional view of a media device 400 including a vibration source 414 and/or POM sensor 416 according to an illustrative embodiment of the invention. The media device 400 comprises an upper housing 402. The main structural frame 404 is secured to the housing 402 which may be fabricated from a die-castable material using a die-casting process. The frame 404 includes a surrounding sidewall 406 and a web or backplane 408. The web 408 extends between the sidewall 406 and forms a printed circuit board compartment between the housing 402 and web 408. The printed circuit board compartment is bounded on the top by the housing 402 and on the bottom by the web 408. The printed circuit board compartment includes a printed circuit board 410 and associated electrical components 412. The web 408 supports or houses a battery 414 which, in turn, forms the back of the cellular telephone 400.

The media device 400 may employ a unitized frame member 404 which is composed of a single die-castable material, typically magnesium or zinc, where the sidewall 406 and the web 408 are constructed of the same or different material via a die-cast fabrication technique. In one embodiment, the media device 400 includes at least one vibration source 414. In another embodiment, the media device 400 includes at least one POM sensor 416. In certain embodiments, one or both of the at least one vibration source 414 and POM sensor 416 are in communication with the web 408, the circuit board 410, and/or a portion of a sidewall 406.

In the embodiment shown in FIG. 4, the POM sensor 416 and vibration source 414 are in communication with the web 408 and/or frame 404. In certain embodiments, at least one of the POM sensor 416 and vibration source 414 are mounted to and/or in communication with one or more of the web 408, the frame 404, the circuit board 410, the housing 402, and any other component or element of the media device 400.

In one embodiment, a portion of the printed circuit board 410, the memory 320, storage 304, processor 302, a battery, and a driver circuit 328 or 418, operate to form a vibration generating circuit for the vibration source 414. In certain embodiments, the vibration source 414 includes a generating motor. In other embodiments, the vibration source includes a solenoid or other elements that generates a vibration, vibration pattern, and/or vibration sequence in response to an application running on the processor 302.

By way of example, one of the vibration generating motors, "FM16, FM23, FM25 or FM29" or "CM-5", manufactured by the Tokyo Parts Industries Corporation, LTD of Tokyo, Japan, may be utilized as a vibration source 414. By further example, the "FM" motor employs an eccentric member that is attached to a rotating shaft incorporated in a cylindrical case. The eccentric member is rotated according to a rotation of the rotation shaft, and thereby, a vibration is generated from the vibration source 414 that is coupled to at least one of the web 408, the frame 404, the circuit board 410, the housing 402, and any other component or element of the media device 400. By another example, the "CM" motor employs a armature coil that is mounted in an eccentric manner. By rotating the armature, a vibration is generated. Further, if the vibration source 414 employs a solenoid, a core within the solenoid is reciprocally moved and, thereby, a vibration is generated.

Regardless of the physical element employed, the vibration source 414 may be driven by the driver circuit 328 and/or 418 in response to the processor 302. The consumption of electric power by the vibration source 414 may be substantial. Accordingly, an application may be employed to provide for the activation and/or deactivation of the vibration source 414 depending on the power needs of the media device 400. In certain embodiments, the vibration source driver circuit 328 and/or 418 is configured to adjust at least one of the frequency of vibration, strength of vibration, and/or period of vibration in one or more pre-selected or defined sequences and/or patterns.

Figure 5:
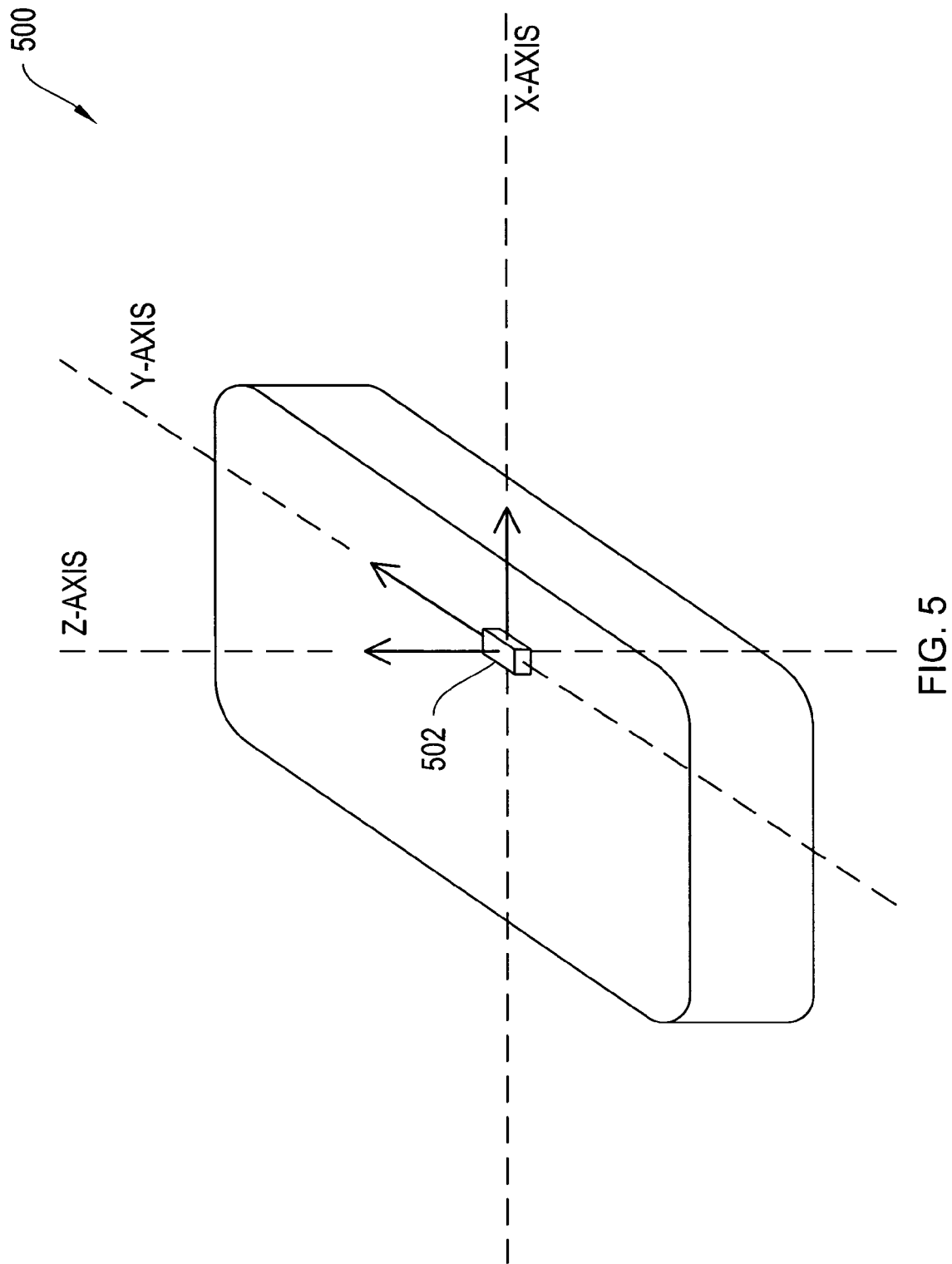
FIG. 5 is a perspective transparent view of an three-dimensional accelerometer within a media device according to an illustrative embodiment of the invention.

FIG. 5 is a perspective transparent view of an three-dimensional acceleration sensor or accelerometer 502 within a media device 500 according to an illustrative embodiment of the invention. In certain embodiments, the POM sensor 416 includes an acceleration sensor and/or accelerometer 502 that detects an acceleration in three axial directions of the media device 500, i.e., the up-down direction (Y-axis), the left-right direction (X-axis), and the front-rear direction (the Z-axis). The acceleration sensor allows the inclinations and movements of the media device 500 in the X-axis, Y-axis and Z-axis directions to be determined. In one embodiment, acceleration data detected by the acceleration sensor 502 is transmitted to the processor 302 for processing to enable determination of the position, orientation, and/or movement of the media device 500.

In one embodiment, the media device 500 includes a three-axis or three-dimensional, linear acceleration sensor 502 that detects linear acceleration in each of the three axial directions shown in FIG. 5. In an alternative embodiment, a two-axis linear accelerometer is employed that detects linear acceleration along each of the X-axis and Y-axis (or other pair of axes). A two-axis sensor may be sufficient depending on the types of positions, orientations, and movements that are desired to be detected and/or used to control the media device 500. By way of example, the three-axis or two-axis linear accelerometer 502 may be of the type available from Analog Devices, Inc. or STMicroelectronics. The acceleration sensor 502 may be an electrostatic capacitance or capacitance-coupling type that is based on silicon micro-machined MEMS (microelectromechanical systems) technology. In certain embodiments, other forms of accelerometer technology such as, without limitation, piezoelectric or piezoresistance based sensors may be employed to provide three-axis or two-axis acceleration detection.

Because the linear acceleration sensor 502 may only be capable of detecting acceleration along a straight line corresponding to each axis of the acceleration sensor, the acceleration sensor 502 may not be capable of directly detecting movement in the form of a non-linear (e.g. circular) path, a rotation, a rotational movement, an angular displacement, a tilt, a position, an attitude or another physical characteristic. Accordingly, in certain embodiments, through additional processing of the linear acceleration signals output from the acceleration sensor 502, additional information relating to the position, orientation, or movement of the media device 500 may be inferred or calculated by an application running on the processor 302.

For example, by detecting a static, linear acceleration (i.e., gravity), the linear acceleration output of the acceleration sensor 502 may be used to infer or calculate tilt or inclination of the media device 500 relative to the gravity vector by correlating tilt angles with detected linear acceleration. In this way, the acceleration sensor 502 may be used in combination with the processor 302 (or another processor) to determine tilt, attitude or position of the media device 502. Similarly, various movements, patterns of movement, and/or positions of the media device may be calculated or inferred through processing of the linear acceleration signals generated by the acceleration sensor 502 when the media device 500 is subjected to dynamic accelerations by, for example, the hand of a user. In one embodiment, the acceleration sensor 502 may include an embedded signal processor or other type of dedicated processor for performing any desired processing of the acceleration signals output from the acceleration sensor 502 and/or other accelerometers in the media device 500 prior to outputting signals to the processor 302. In certain embodiments, the embedded or dedicated processor or processors may convert the detected acceleration signal to a corresponding tilt angle when the acceleration sensor 502 is intended to detect static acceleration (i.e., gravity).

Figure 6:
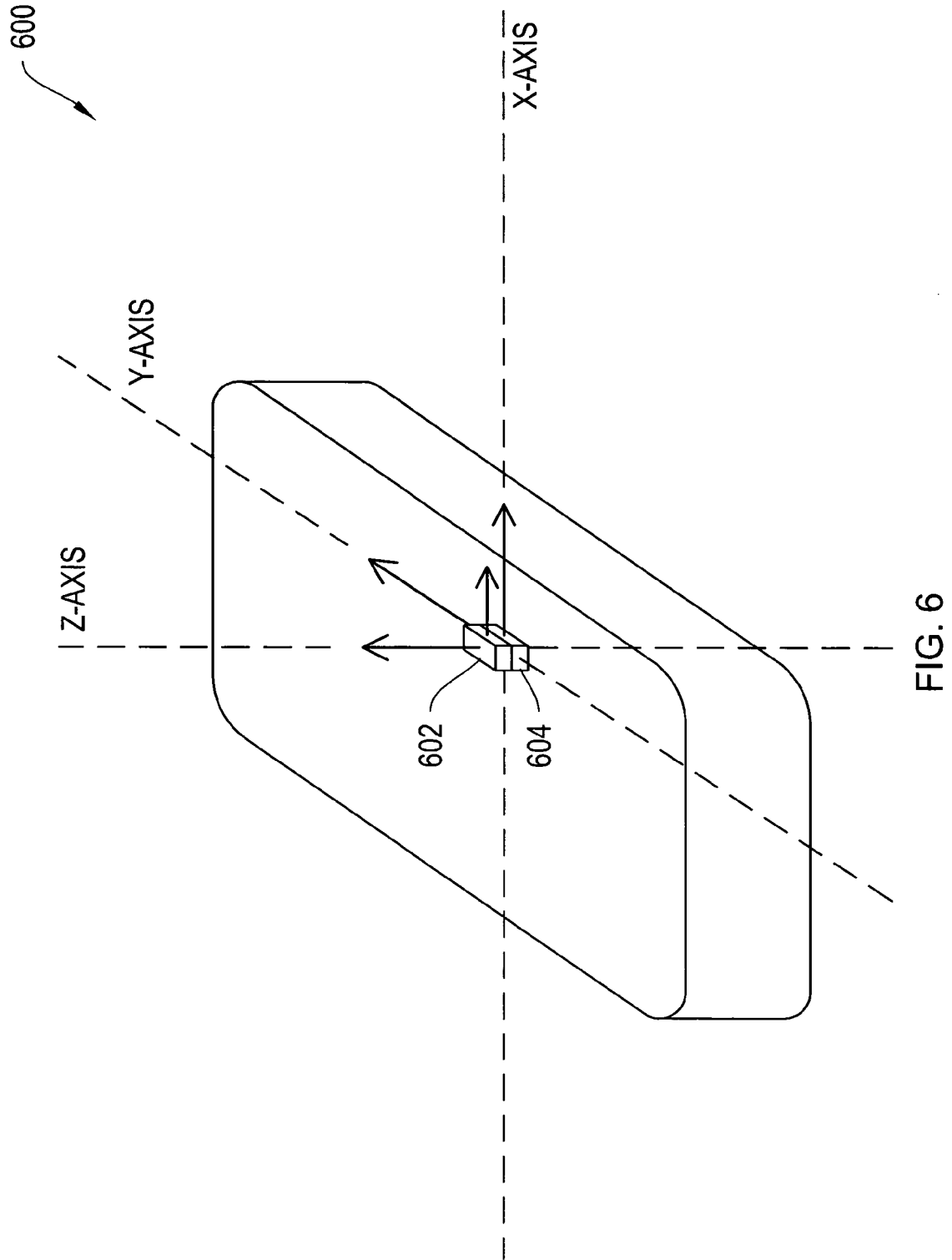
FIG. 6 is a perspective transparent view of a pair of two-dimensional accelerometers within a media device according to an illustrative embodiment of the invention.

FIG. 6 is a perspective transparent view of a pair of two-dimensional accelerometers 602 and 604 within a media device 600 according to an illustrative embodiment of the invention. In certain embodiments, instead of using a single three-dimensional accelerometer, two two-dimensional accelerometers 602 and 604 may be arranged in relation to each other so as to enable three-dimensional sensing of the position, orientation, and movement of the media device 600.

Figure 7:
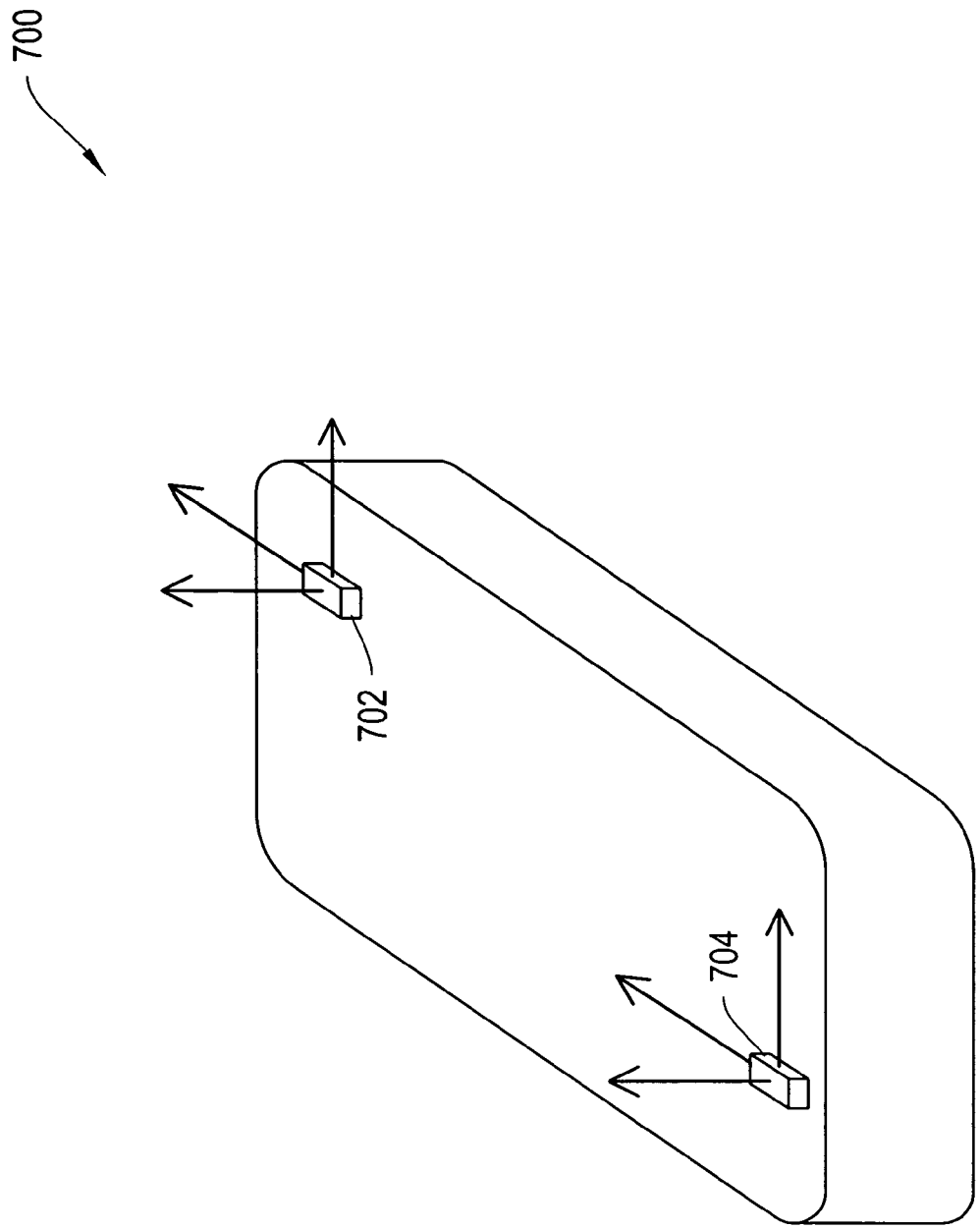
FIG. 7 is a perspective transparent view of a pair of three-dimensional accelerometers within a media device according to an illustrative embodiment of the invention.

FIG. 7 is a perspective transparent view of a pair of three-dimensional accelerometers 702 and 704 within a media device 700 according to an illustrative embodiment of the invention. In certain embodiments, two or more three-dimensional accelerometers may be employed by the media device 700 for enhanced sensing capabilities. In other embodiments, a plurality of accelerometers 702 and 704 may be positioned within the media device 700 at any one of a plurality of locations.

Figure 8:
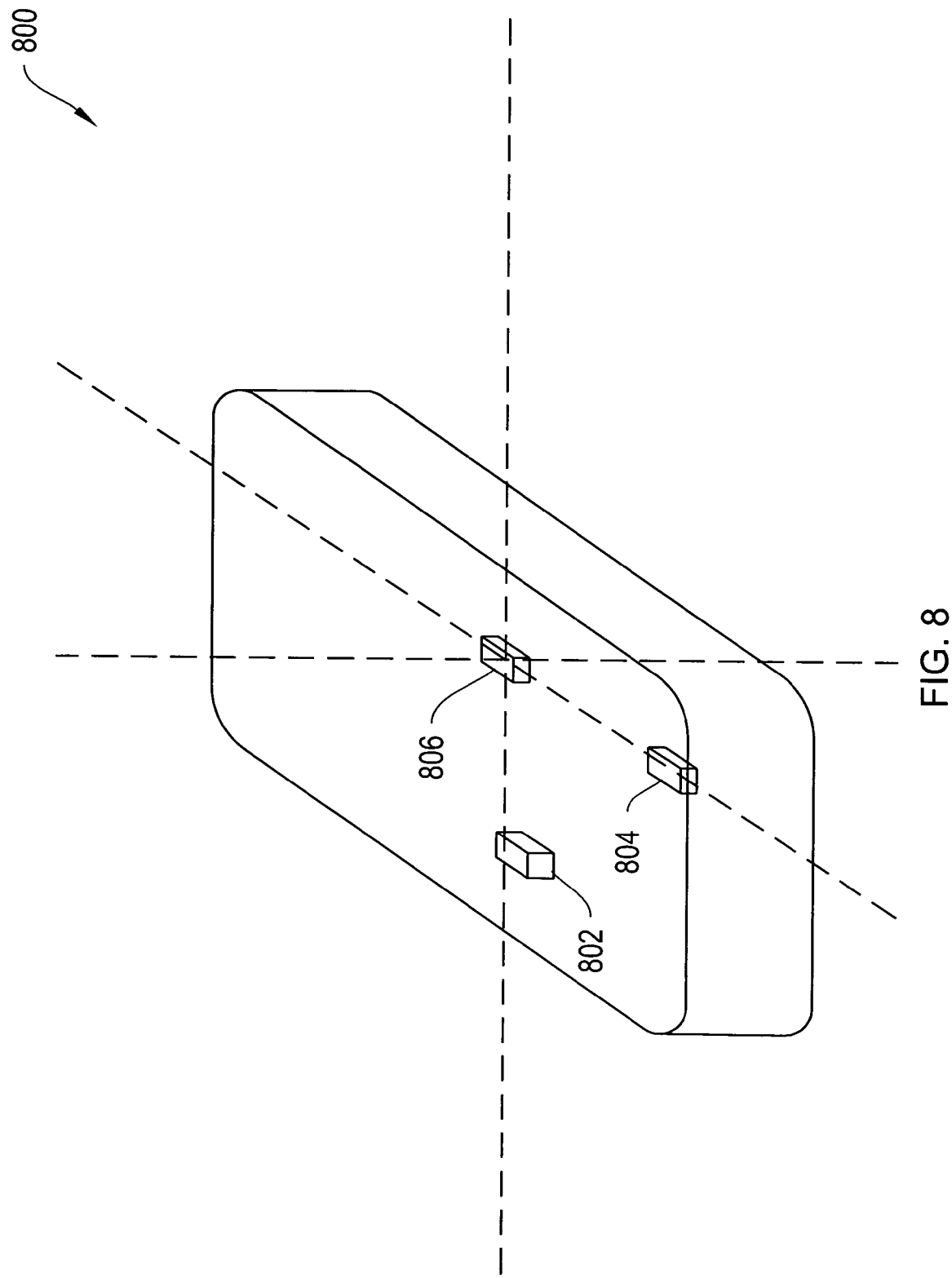
FIG. 8 shows a perspective transparent view of a plurality of POM sensors within a media device according to an illustrative embodiment of the invention.

FIG. 8 shows a perspective transparent view of a plurality of POM sensors 802, 804, and 806 within or attached to a media device 800 according to an illustrative embodiment of the invention. In one embodiment, a gyro-sensor or gyroscope 802 may be employed instead of or in addition to an acceleration sensor 804. In certain embodiments, the gyro-sensor 802 may include a rotating or vibrating element. Exemplary MEMS gyro-sensors that may be used in this embodiment are available from Analog Devices, Inc. Unlike the linear acceleration sensor 804, a gyro-sensor 802 is capable of directly detecting rotation (or angular rate) around an axis defined by the gyroscopic element (or elements) of the gyro-sensor 802. Because there are fundamental differences between a gyro-sensor 802 and a linear acceleration sensor 804 (e.g., angle-based vs. vector-based output), different processing operations are performed on the output signals from these different sensors devices.

For example, when tilt or inclination is calculated using a gyro-sensor 802 instead of the acceleration sensor, different algorithms and/or applications may be employed by the processor 302 to determine position, orientation, and/or movement of the media device 800. In one embodiment, when using a gyro-sensor 802, the value of inclination is initialized at the start of detection. Then, data on the angular velocity which is output from the gyroscope 802 is integrated. Furthermore, a change in amount of inclination from the value of inclination previously initialized is calculated. In this case, the calculated inclination corresponds to an angle. In contrast, when an acceleration sensor 804 is used, the inclination may be calculated by comparing the value of the acceleration of gravity of each axial component with a predetermined reference. Accordingly, the calculated inclination may be represented as a vector and, without initialization, an absolute direction may be determined with an accelerometer. In certain embodiments, one or more POM sensors may be employed to detect at least one of absolute and relative position, orientation, and movement information.

The type of the value calculated as an inclination may also be different between a gyroscope 802 and an accelerometer 804. For example, the value may be an angle when a gyroscope 802 is used, but a vector when an acceleration sensor 804 is used. Accordingly, when a gyroscope 802 is used instead of an acceleration sensor 804 or vice versa, the sensor data on inclination may be processed by a predetermined conversion that takes into account the fundamental differences between a gyro-sensor 802 and an accelerometer 804. Due to the fact that the nature of gyroscopes is known to one skilled in the art, as well as the fundamental differences between linear accelerometers and gyroscopes, further details are not provided herein. While gyro-sensors provide certain advantages due to their ability to directly detect rotation, linear acceleration sensors may be more cost effective when used in connection with portable media device 800.

In certain embodiments, the media device 800 may include an environmental or POM sensor 806 in addition to at least one of an accelerometer 804 and a gyro-sensor 802. The additional sensor 806 may be a light sensor, an infrared (IR) sensor, proximity sensor, capacitive proximity sensor, acoustic sensor, a microphone, sonic or sonar sensor, radar sensor, image sensor, video sensor, global positional system (GPS) detector, RF detector, RF triangulation detector, RF or acoustic doppler detector, or other like environment sensor. In one embodiment, the media device 800 employs a plurality of POM and environmental sensors 802, 804, and 806 to determine the position, orientation, and/or movement of the media device 800.

As discussed previously, there is a need for providing a user interface in a personal media device that minimizes either or both a user's physical and visual interactions with the personal media device, especially while the user is performing other activities that require, for example, the user's visual senses. In one embodiment, this need is addressed by providing a media device including an environmental or POM sensor that generates a sensor signal based on at least one of a position, orientation, and movement of the media device. The media device also includes a processor that receives the environmental or POM sensor signal and controls one or more operations of the media device based at least in part on the sensor signal. For example, by performing one or more defined or pre-selected movements of the media device, a user can control various operations of the media device.

One operation may include stepping through a list of elements associated with an application. The stepping may occur in an increment where the increment is proportional to an intensity of at least one of a rate of change in position, a rate of change in orientation, and a rate of movement from an environment sensor of the media device. An operation may include at least one of starting or launching one or more applications, stopping or ending one or more applications, selecting or de-selecting one or more elements, increasing or decreasing one or more settings, moving through a list of elements, initiating or ending a communications session, playing music or video, pausing music or video, and initiating or ending an audio or video recording session. An element may include at least one of a song, a video, a music file, an audio file, a video file, a photograph, a media file, an application icon, an activation icon, a control button, a data file, and contact data.

Figure 9:
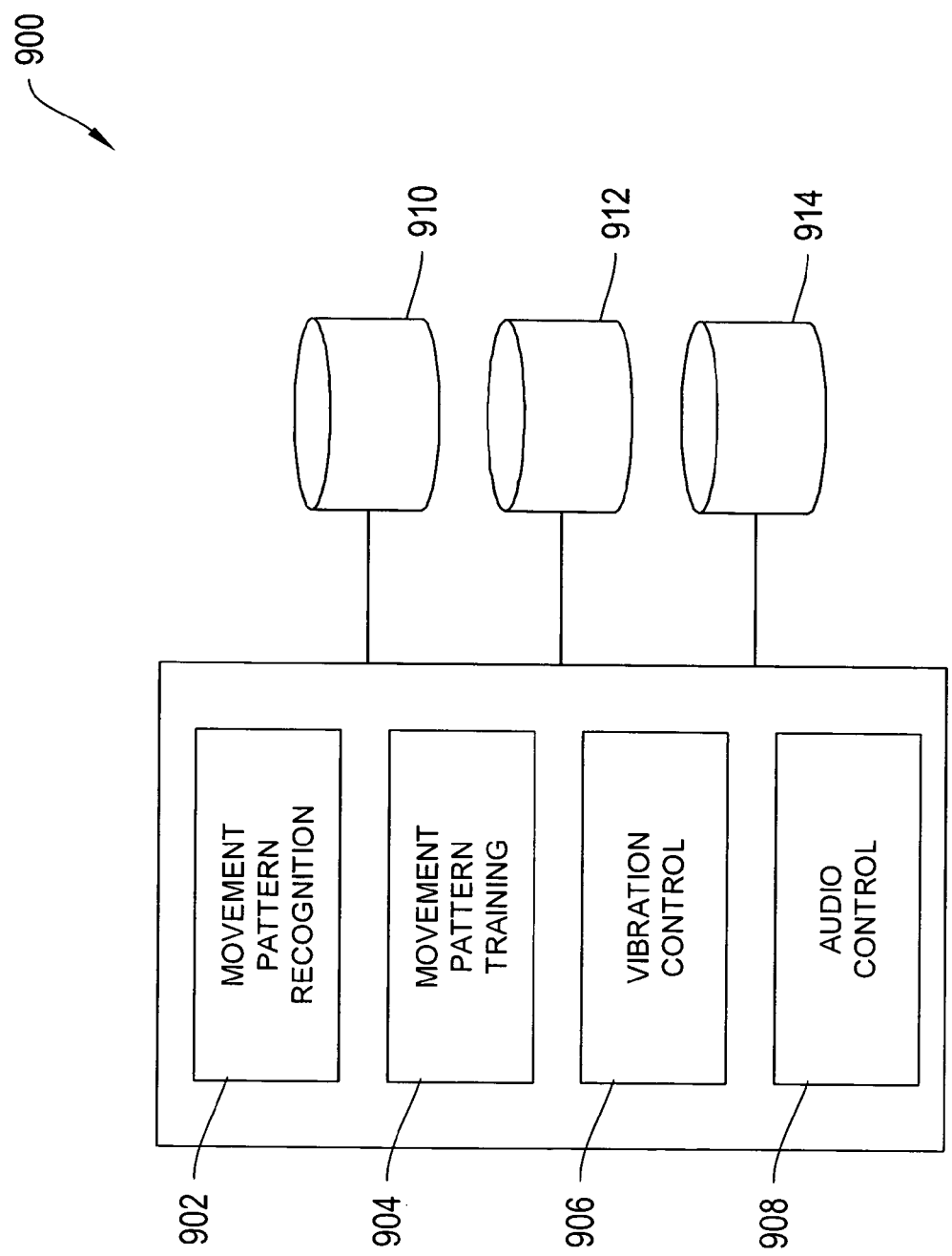
FIG. 9 is a conceptual diagram of a computer processing environment 900 including various applications or routines running within a media device according to an illustrative embodiment of the invention.

FIG. 9 is a conceptual diagram of a computer processing environment 900 including various applications or routines running within a media device according to an illustrative embodiment of the invention. The processing environment 900 includes a movement pattern recognition application 902, a movement pattern training application 904, a vibration control application 906, and a audio control application 908. The processing environment 900 also includes a movement pattern database 910, a vibration pattern database 912, and an audio pattern database 914. In certain embodiments, the processing environment 900 runs on the processor 302 and/or on another processor within a media device such as media device 100.

In operation, the movement pattern recognition application 902 receives sensor signal inputs from at least one environment sensor such as, for example, acceleration sensor 804 of FIG. 8, and compares the received sensor signal with a list of known sensor signals in the database 910 to determine an operation of the media device to perform. In one embodiment, the sensor signal includes sensor signals associated with a sequence or pattern of movements, positions, and/or orientations of the media device 100 over a period of time. Hence, the application 902, in certain embodiments, recognizes position, orientation, and/or movement patterns using the list of pattern and/or POM fingerprint information in the database 910.

The movement pattern recognition application 902 may be activated by a user by holding the display, pressing an icon on the display, pressing a button on the media device interface, and/or touching a bezel either alone or in combination with a particular movement pattern. In certain embodiments, one or more operations of the media device may be initiated by a user by holding the display, pressing an icon on the display, pressing a button on the media device interface, and/or touching a bezel either alone or in combination with a particular known movement pattern. By requiring the user to explicitly interact with a portion of the media device (e.g, touching the display, button, icon, and/or bezel) while performing a movement pattern, the possibility of inadvertently initiating a media device operation is minimized or eliminated. In one embodiment, the application 902 may be called or activated by another application running on a media device.

The media device may employ a grip detector or proximity sensor that senses when the phone is in a user's hand to ignore changes in position, orientation, or movement that are not based on the user's hand movements and/or positioning, or to enable activation of motion sensing applications. In one embodiment, the grip detector may include one or more switches and/or buttons to detect the presence of at least one, two, three, and four fingers.

Figure 10:
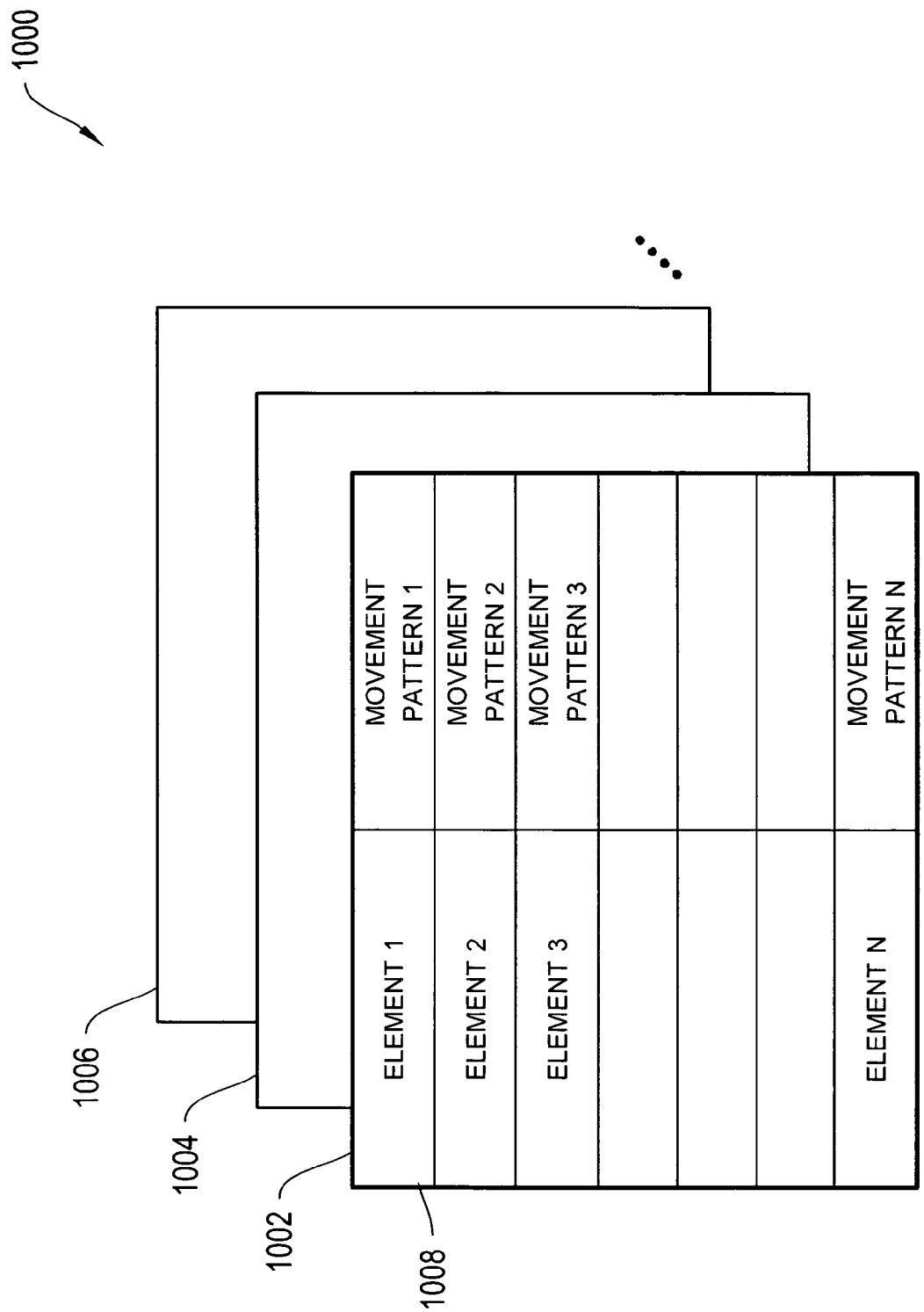
FIG. 10 is a diagram of a database or list associating movement patterns with data elements of an application within a media device according to an illustrative embodiment of the invention.

FIG. 10 is a diagram of a database 1000 including one or more lists associating movement patterns with data elements of one or more applications within a media device according to an illustrative embodiment of the invention. In one embodiment, as discussed above, an element may include at least one of a song, a video, a music file, an audio file, a video file, a photograph, a media file, an application icon, an activation icon, a control button, a data file, and contact data. The database 1000, which corresponds to database 910 in certain embodiments, may include multiple lists 1002, 1004, and 1006 of elements 1008 where each list is associated with a particular application of the media device 100. In certain embodiments, an element may include an operation to be performed by an application.

In operation, in one embodiment, elements 1 through N are associated with movement patterns 1 through N respectively. Thus, when application 1002 is running and the movement pattern recognition application or routine 902 is running, the application 902 may continuously compare received sensor signals with the list of movement patterns associated with application 1002 to determine when one of the elements is to be selected. For example, while running the media device's telephone application, the user may move the media device in a known sequence or pattern to initiate a cellular telephone call to a particular contact. By monitoring the sensor signal inputs from the environmental or POM sensors, the application 902 recognizes the received sensor signal as being associated with, for example, movement pattern 1 which is associated with element 1. Element 1 may, for example, include the particular contact's telephone number. By selecting element 1 while the telephone application is running, the telephone application initiates a call to the particular contact. The inputting, training, and/or storing of known movement patterns is discussed in detail later herein with respect to FIG. 17.

Figure 11:
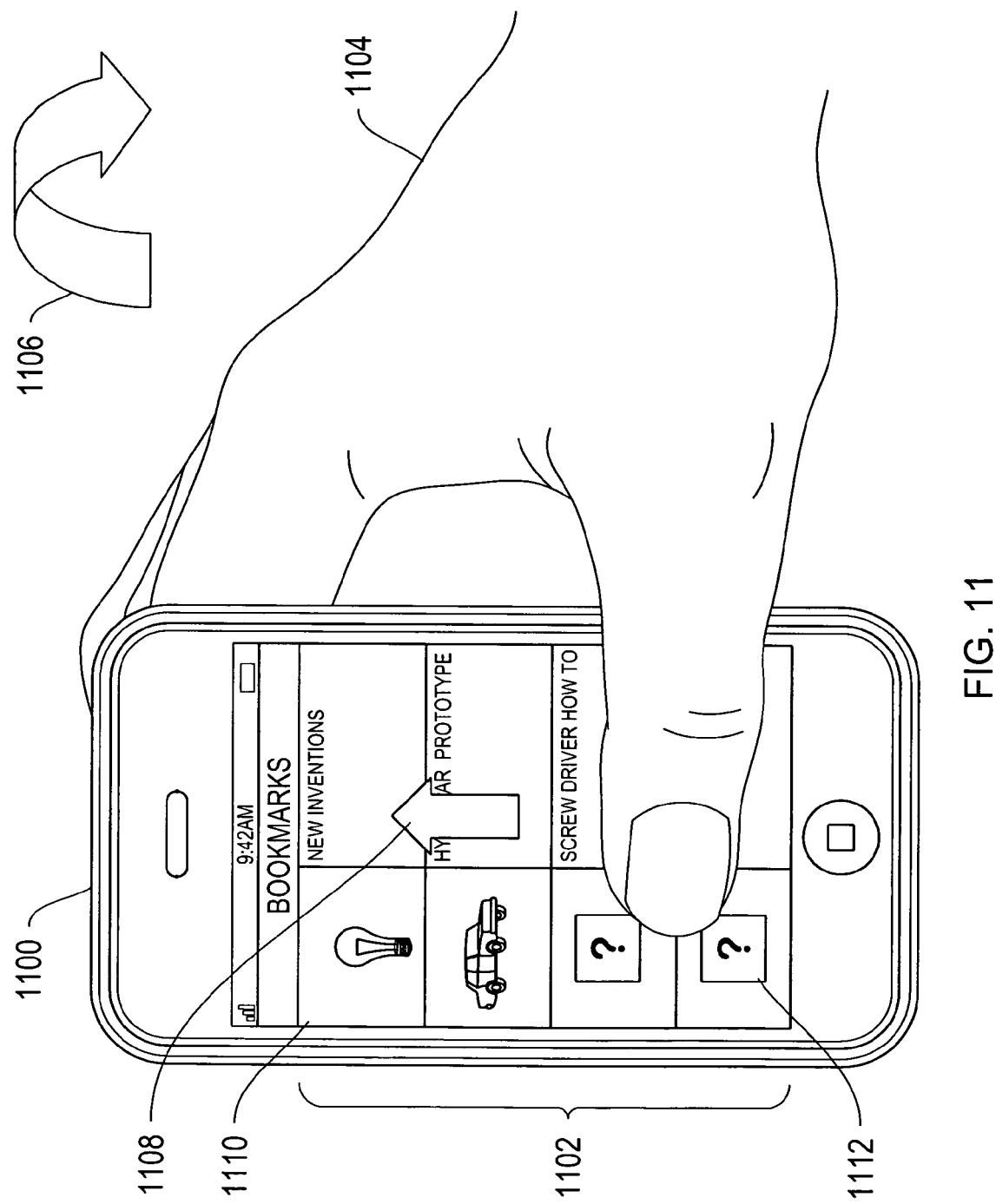
FIG. 11 shows an exemplary process whereby a user steps through or navigates a list of items displayed by an application on a media device by rotating and/or flicking their hand or wrist according to an illustrative embodiment of the invention.

FIG. 11 shows an exemplary process whereby a user steps through a list 1102 of items displayed by an application on a media device 1100 by rotating and/or flicking their hand 1104 or wrist according to an illustrative embodiment of the invention.

In operation, as the user rotates his hand 1104, the media device 1100 rotates in the direction 1106. This triggers a sensor signal which is received by an application that then initiates the movement or shifting of the displayed list or display window of items in the direction 1108 on the display 1110. Because each item 1112 may be an element, by repeatedly tilting or rotating his hand 1104 and then returning to it to the original position, the user steps through the list of elements displayed by the application. In one embodiment, the stepping occurs in an increment proportional to an intensity of at least one of a rate of change in position, a rate of change in orientation, and a rate of movement of the user's flicking action as sensed by at least one environmental sensor of the media device 1100. Accordingly, in certain embodiments, the movement pattern recognition application 902 recognizes changes in position, orientation, and movement at different rates as different movement patterns that may be associated with different elements and/or operations. Accordingly, the user may increase the rate of moving through the list by flicking his hand or wrist more rapidly.

Figure 12:
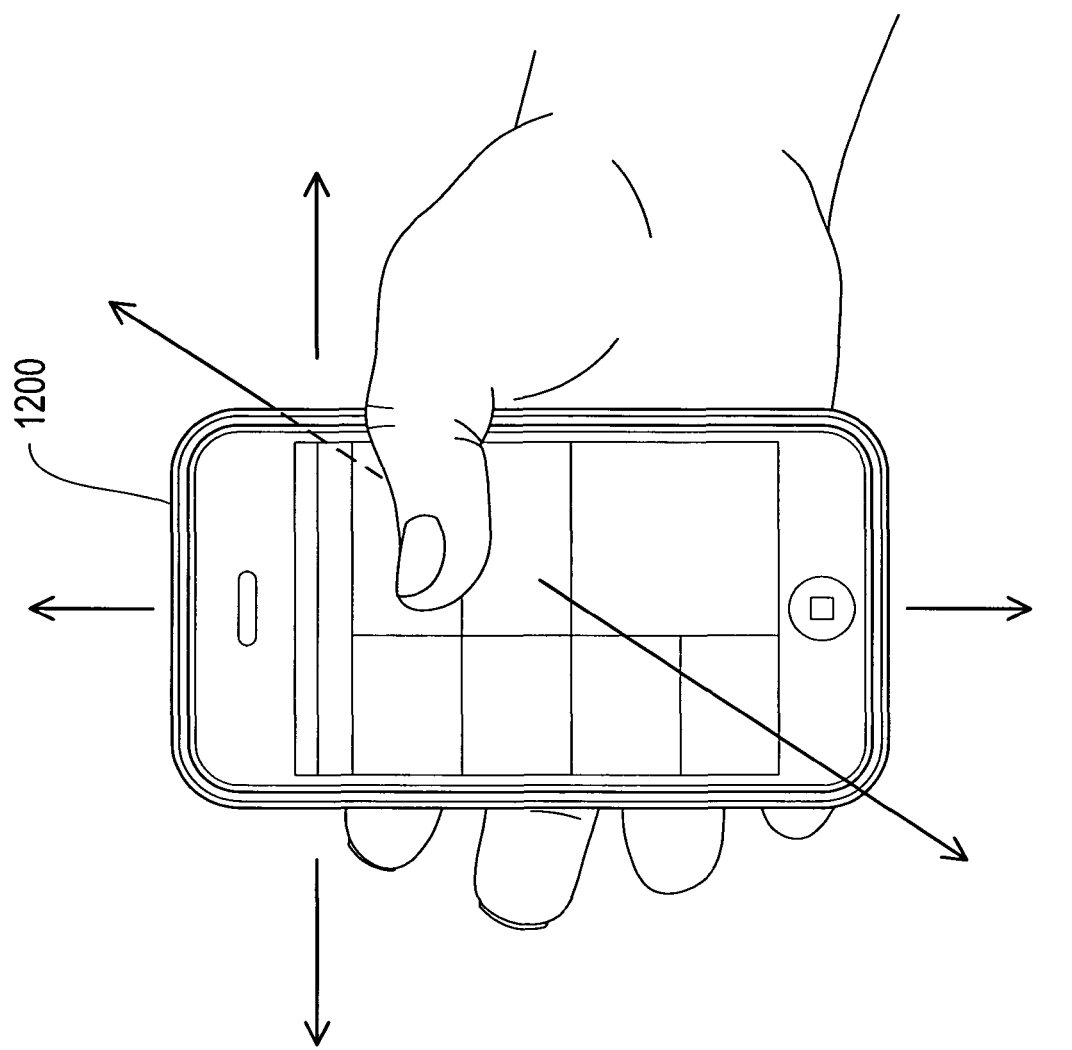
FIG. 12 shows the various dimensions of movement capable of detection, identification, and/or recordation according to an illustrative embodiment of the invention.

FIG. 12 shows the various dimensions of position, orientation, and movement of a media device 1200 that are capable of detection, identification, and/or recordation according to an illustrative embodiment of the invention. As illustrated in FIG. 12, because the one or more environmental sensors of the media device 1200 are able to sense position, orientation, and movement in any direction, a user of the media device 100 may generate an unlimited set movement patterns that are sensible, recordable, and identifiable by the movement pattern recognition application 902 of the media device 1200.

Figure 13:
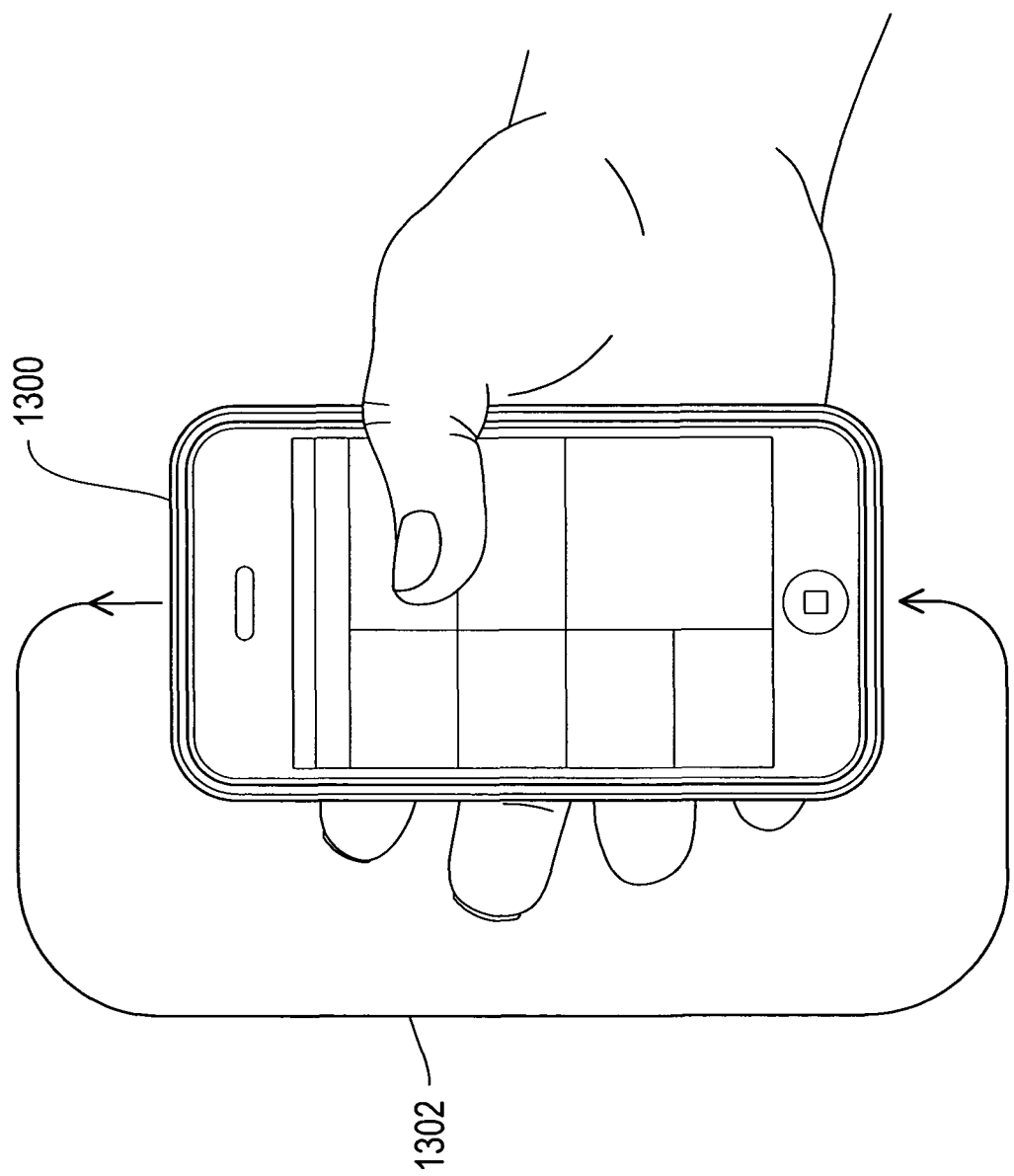
FIG. 13 is an exemplary movement sequence or pattern used for control of a media device according to an illustrative embodiment of the invention.

FIG. 13 shows an exemplary movement sequence or pattern used for control of a media device 1300 according to an illustrative embodiment of the invention. In this illustrative movement, the user moves the media device 1300 in the circular direction indicated by path 1302. However, this is only one example of an unlimited number of movement patterns that a user may perform while holding the media device 1300. For example, without limitation, the media device 1300 may be shaken back and forth, up and down, side-to-side, moved in various looping patterns, titled, twisted, rotated, flipped, swung, cradled, twirled, and/or moved in a any sequence within a three-dimensional space by the user. A user may desire to use a movement pattern that emulates some other activity or action such as, for example, a baseball swing, golf swing, hockey slap shot, or any other known action or expression. The time period for sensing and/or inputting a movement pattern may be adjustable and/or vary based on user selection and/or application selection. Further, an application may adjust its pattern recognition period depending on which subroutine or feature is running. For example, a contact list application may have a relatively short pattern recognition period to enable a user to quickly step through a list of contacts by the user flicking his wrist. Such action may only require about 1-2 seconds. However, to initiate a call to a friend, the pattern recognition period may be adjusted to about 3-5 seconds to allow the user to, for example, emulate a golf swing to initiate a call to a particular telephone number.

In certain embodiments, the application 902 accounts for background changes, either physically or algorithmically, in position, orientation, and movement by sampling the surrounding environment, via at least one POM sensor, either before or after the user performs a movement pattern. For example, if a user is on a train, the application may detect the velocity of the train and account for this background velocity when detecting a movement pattern. In other embodiments, movement patterns include information associated with environmental conditions such as global position, gravity, magnetic field, navigation information, angular momentum, and velocity. By including additional orthogonal vectors of position, orientation, and movement information, the selectivity of pattern recognition is advantageously enhanced. In one embodiment, the media device includes a camera that provides visual and/or graphical measures of the environment surrounding the media device. In certain embodiments, the media device employs a level set method to analyze objects in space which may to used in conjunction with other POM sensors to enhance the determination of the position, orientation, and/or movement of the media device.

Figure 14:
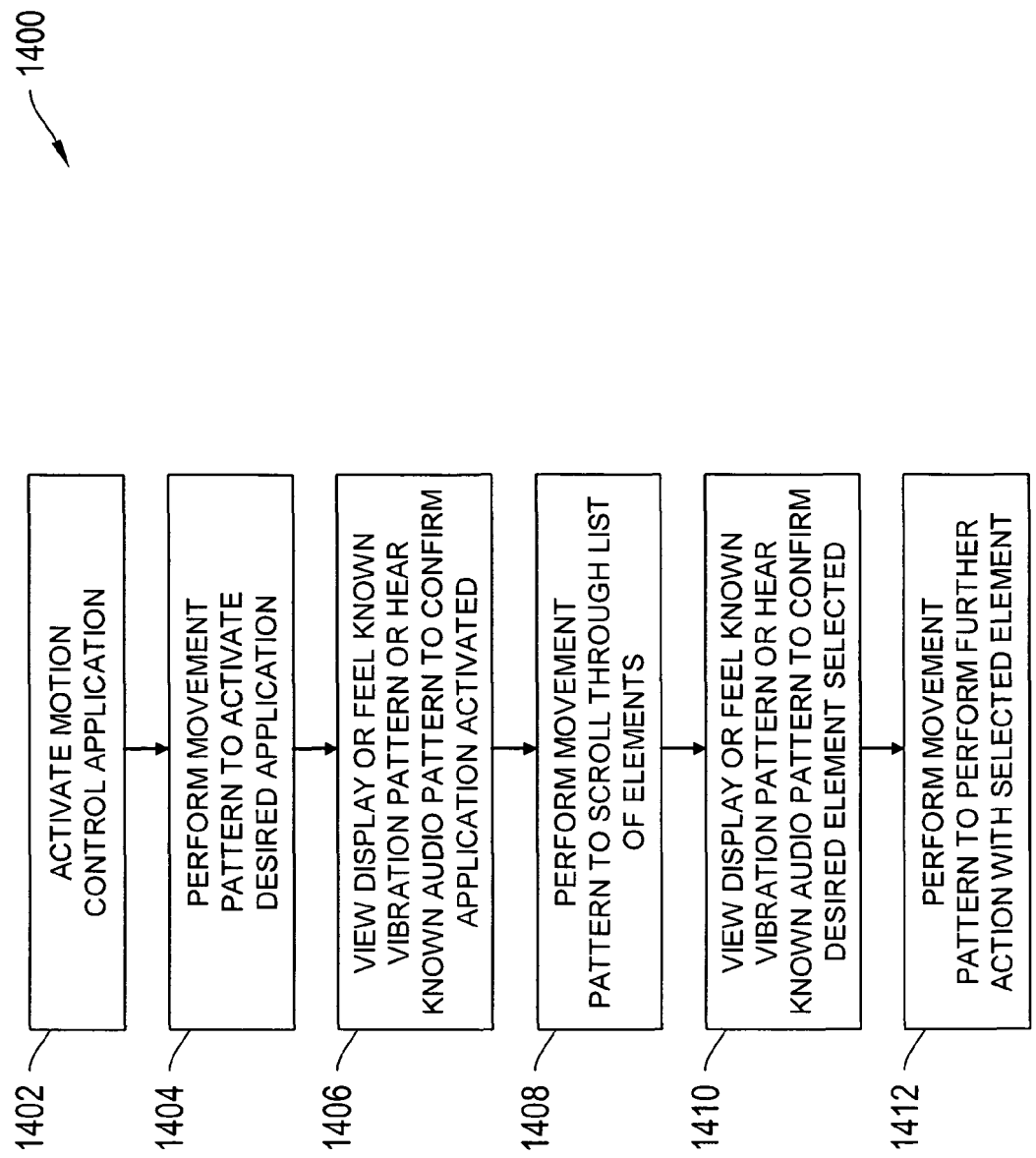
FIG. 14 is flow diagram of a process for interfacing with and/or controlling an application running on a media device according to an illustrative embodiment of the invention.

FIG. 14 is flow diagram of a process 1400 for interfacing with and/or controlling an application running on a media device according to an illustrative embodiment of the invention. In certain embodiments, the user interface of a media device, such as media device 100, enables a user to activate or deactivate one or more motion control or interface applications such as at least one of the applications 902, 904, 906, and 908 of FIG. 9. In other embodiments, one or more applications may include an option or feature that allows a user to activate any one of the applications 902-908 for that application or for a feature of the application [Step 1402]. Once, for example, the application 902 is activated, the user performs a movement pattern (e.g., shaking the media device up and down) to activate a desired application (e.g., cellular telephone application) [Step 1404]. Next, the user views the display and/or feels a known vibration pattern or hears a known audio pattern to confirm that the telephone application has been activated or launched [Step 1406]. Once activated, the telephone application may present a list of contacts and/or pre-programmed phone numbers that the user may call. The user may then perform another movement pattern (e.g., tipping the media device up and down) to scroll through the list of contacts [Step 1408]. When a desired contact is highlighted and/or designated in the list, the user may view the display, feel a known vibration pattern associated with that contact, and/or hear a known audio pattern associated with that contact, or any combination of the above [Step 1410]. Once the contact is highlighted and/or identified, the user may then perform a further movement pattern (e.g., shake side-to-side) to initiate a call to the contact person [Step 1412]. Certain aspects of user interface operations and navigation with the media device are also described in U.S. patent application Ser. No. 11/295,694, filed on Dec. 5, 2005, the entire contents of which are incorporated herein by reference. As illustrated in FIG. 14, a user, in certain embodiments, can navigate through the menus and application features presented by a user interface of a media device using movement patterns and by receiving motion and/or audio based feedback without the need to view the interface.

Figure 15:
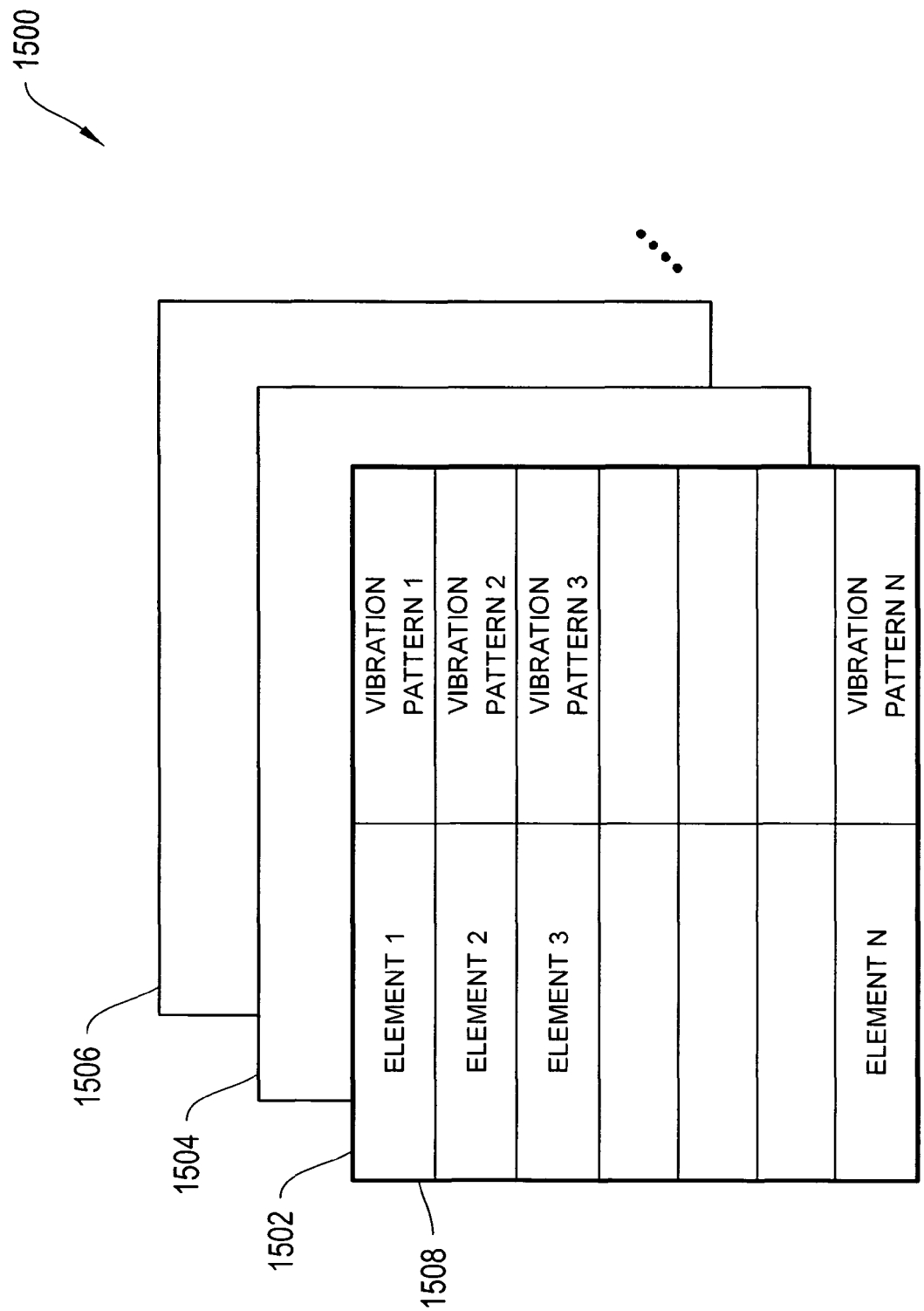
FIG. 15 is a diagram of a database or list associating vibration patterns with data elements of an application within a media device according to an illustrative embodiment of the invention.

FIG. 15 is a diagram of a database 1500 or list associating vibration patterns with data elements of one or more applications within a media device. In one embodiment, as discussed above, an element may include at least one of a song, a video, a music file, an audio file, a video file, a photograph, a media file, an application icon, an activation icon, a control button, a data file, and contact data. The database 1500, which corresponds to database 912 in certain embodiments, may include multiple lists 1502, 1504, and 1506 of elements 1508 where each list is associated with a particular application of a media device such as media device 100 of FIG. 1. In certain embodiments an element may include an operation to be performed by an application. Thus, when a user selects a particular contact in a list which, for example, corresponds to element 1 of list 1502, the vibration control application 906 retrieves the vibration pattern 1 from the database 1500 and uses the vibration pattern 1 to control vibration source driver 328, which then drives a vibration source, e.g., vibration source 414, resulting in a vibration of the media device in the known vibration pattern 1. The known vibration pattern 1 is then felt by the media device user and recognized as being associated with the desired contact or element.

In one embodiment, elements 1 through N are associated with vibration patterns 1 through N respectively. Thus, when application 1502 is running and the vibration pattern recognition application or routine 906 is running, the application 906 controls the vibration source 414 to initiate a vibration pattern when a particular element is selected.

Figure 16:
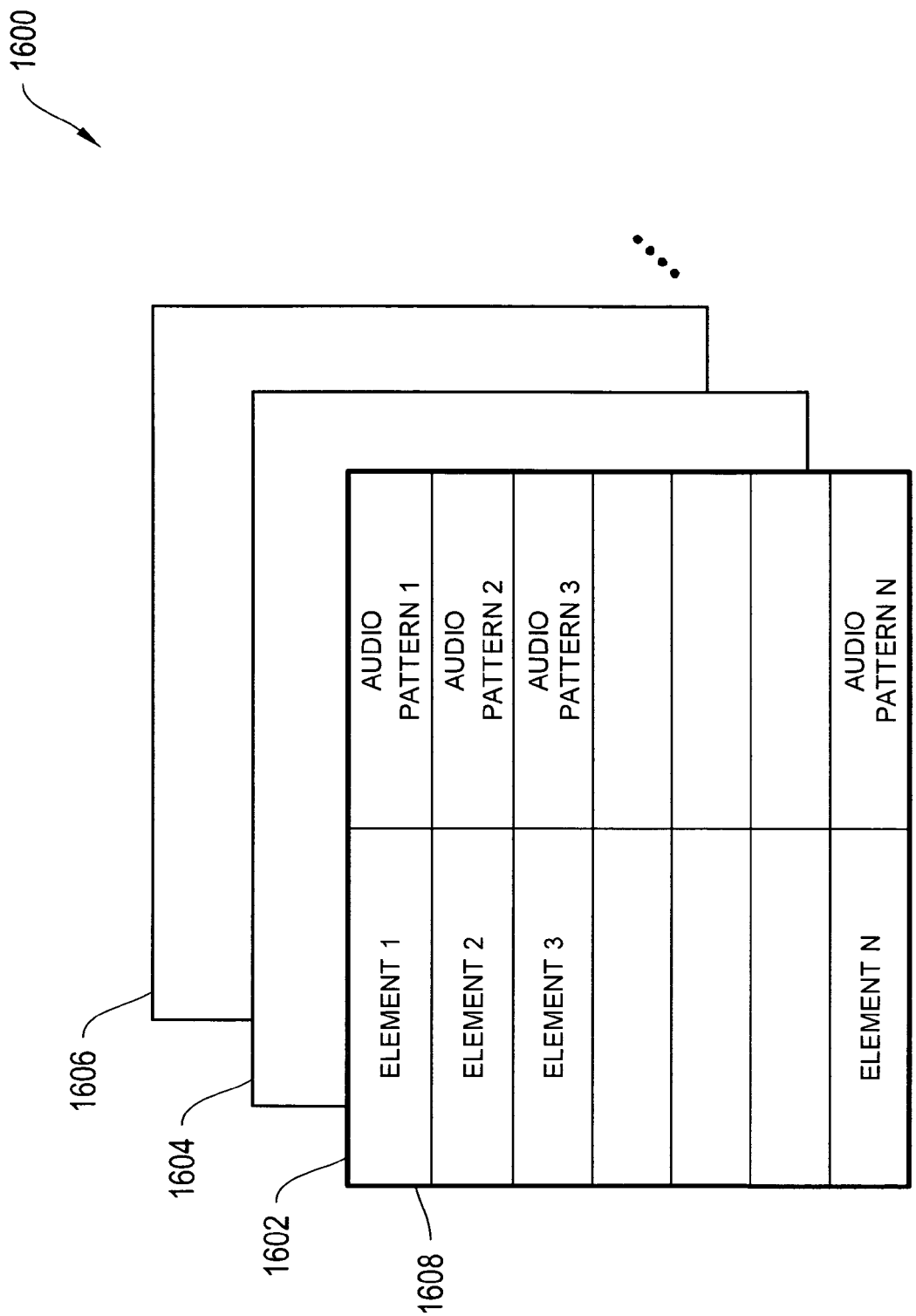
FIG. 16 is a diagram of a database or list associating audio patterns with data elements of an application within a media device according to an illustrative embodiment of the invention.

FIG. 16 is a diagram of a database 1600 or list associating audio patterns with data elements of an application within a media device according to an illustrative embodiment of the invention. In one embodiment, as discussed above, an element may include at least one of a song, a video, a music file, an audio file, a video file, a photograph, a media file, an application icon, an activation icon, a control button, a data file, and contact data. The database 1600, which corresponds to database 914 of FIG. 9 in certain embodiments, may include multiple lists 1602, 1604, and 1606 of elements 1608 where each list is associated with a particular application of a media device such as media device 100 of FIG. 1. In certain embodiments an element may include an operation to be performed by an application. Thus, when a user selects a particular contact in a list which, for example, corresponds to element 1 of list 1602, the audio control application 908 retrieves the audio pattern 1 from the database 1600 and uses the audio pattern 1 to control a speaker, e.g., speaker 324, resulting in a audio sequence being emitted from the media device in a known audio pattern. The known audio pattern is then heard by the media device user and recognized as being associated with a desired contact.

In one embodiment, elements 1 through N are associated with audio patterns 1 through N respectively. Thus, when application 1602 is running and the audio control application or routine 908 is running, the application 908 controls the speaker 324 output to initiate a audio pattern when a particular element is selected. The audio pattern may include, without limitation, a portion of a song, a portion of a recording, a portion of an audio file, a sequence of tones, a sequence of rings, and/or a combination of the foregoing audio outputs.

Figure 17:
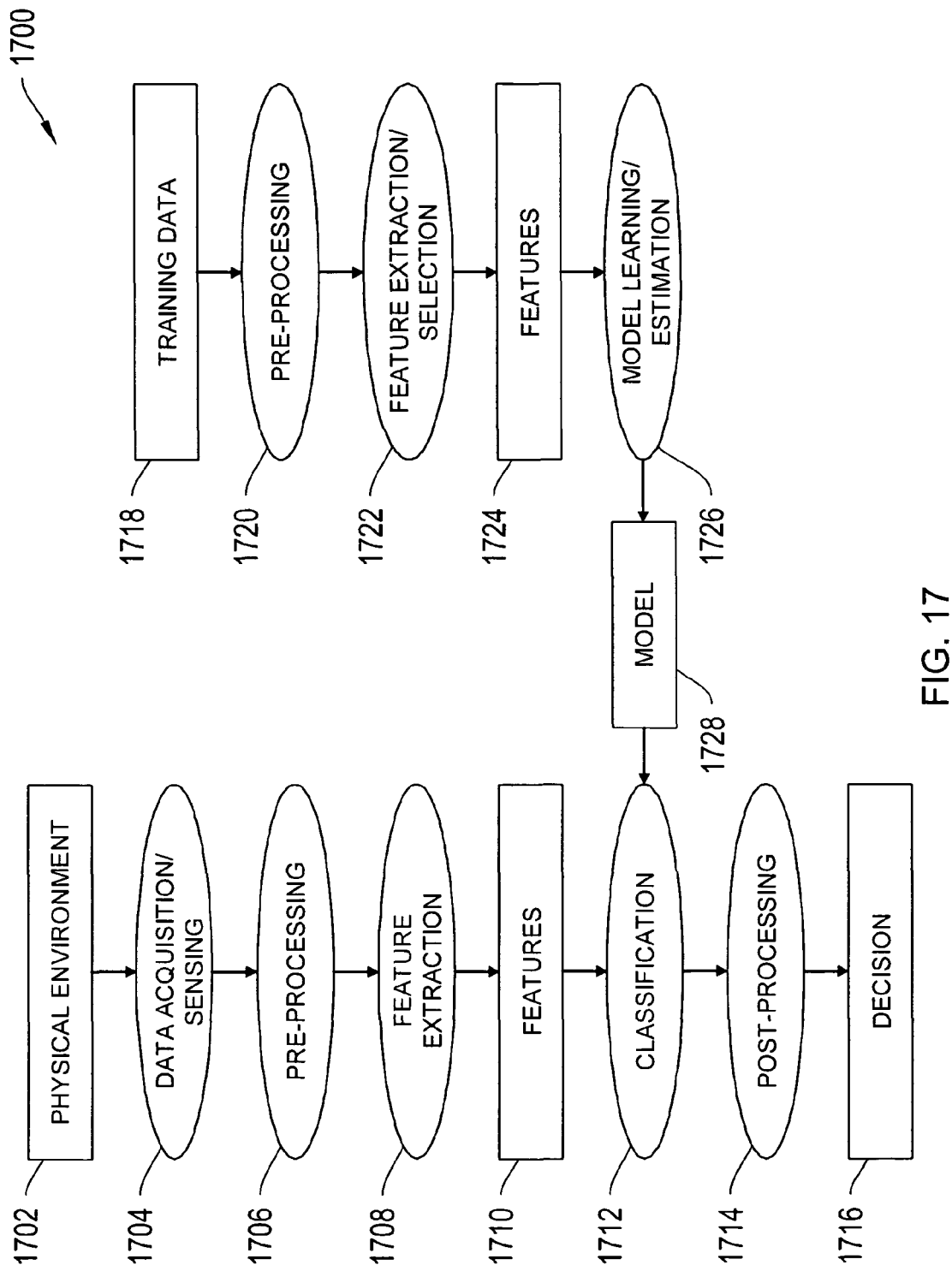
FIG. 17 is a flow diagram of a process for inputting and identifying movement patterns based on one or more pattern recognition algorithms according to an illustrative embodiment of the invention.

FIG. 17 is a flow diagram of a process 1700 for inputting and identifying movement patterns based on one or more pattern recognition algorithms according to an illustrative embodiment of the invention. In certain embodiments, the movement pattern recognition application 902 and movement pattern training application 904 employ one or more pattern recognition algorithms and/or techniques to identify various movement pattern of a media device. First, the media device 100 is subjected to a surrounding physical three-dimensional environment where the device experiences various changes in position, orientation, and movements [Step 1702]. The media device 100 employs one or more POM sensors to measure changes in position, orientation, and movement. In certain embodiments, the applications 902 and 904 account for bandwidth, resolution, sensitivity, distortion, signal-to-noise ratio, latency, and other issues with regard to data acquisition using the one or more POM sensors [Step 1704].

The applications 902 and 904 may perform pre-processing of the sensor signals to remove noise and/or to isolate patterns of interest from background information [Steps 1706 and 1720]. Then, the applications 902 and 904 may perform feature extraction by finding new representations in terms of identified features of sensor signals [Steps 1708 and 1722]. Particular features of sensor signals may be identified as being more relevant for pattern identification [Steps 1712 and 1724]. Feature selection may include identifying discriminative features of sensor signals such as similar values for similar patterns or different values for different patterns. Feature selection may include identifying invariant features such as with respect to translation, rotation, and/or scale of sensor signals. Feature selection may include identifying robust features with respect to occlusion, distortion, deformation, and variations in environment.

The training application 904 may capture training data in the form of an input from the user [Step 1718]. In one embodiment, an application may provide an option associated with an element that enables a user to input a movement pattern into the database 910 and/or 1000 associated with the element. In another embodiment, the user is prompted to perform the movement once, twice, thrice, or more times as part of a training process for the movement pattern training application 904. In other embodiments, the user may be given the option after a particular movement to indicate that it is associate with a particular element. This may be advantageous where the media device selects the wrong element because the user will have the opportunity to identify the intended element which can then be used as further training data.

After pre-processing, feature extraction, and selection, the application 904 may then perform model learning and estimation whereby the application 904 learns to map between features and pattern groups and categories of sensor signals [Step 1726]. The application 904 may select a pattern recognition model that is parametric or non-parametric. The application 904 may select a type of model that include at least one of templates, decision-theoretic or statistical, syntactic or structural, neural, and hybrid forms of pattern recognition analysis [Step 1728].

Once a particular model is selected, the movement pattern recognition application 902 performs a classification and/or matching of the received sensor signal using features and learned models from the movement pattern training application 904 to assign the received movement pattern to a category of patterns. The application 902 may then compare the received sensor signal with the set of movement patterns in the database 1000 to find the closest match between the received sensor signal and the stored array of known movement patterns [Step 1712]. The application 902 may perform post-processing by evaluating its confidence in the decision [Step 1714]. The application 902 may then decide which known pattern of the database 1000 corresponds to the received sensor signal.

In certain embodiments, the features of the known movement patterns may be limited to minimize costs in processing power and storage. Accordingly, the selectivity of identifying a particular pattern may vary depending on the number of points or features stored or used for each known movement pattern. In another embodiment, the known movement pattern can be pre-generated and stored in the media device by the manufacturer or another entity.

The movement pattern recognition application 902 may perform pattern recognition based on at least one of Bayes Decision Theory, Generative methods, discriminative methods, non-metric methods, algorithm-independent machine learning, unsupervised learning and clustering, and like techniques. The Bayes Decision techniques may include, without limitation, at least one of Bayes Decision Rule, minimum error rate classification, normal density and discriminant functions, error integrals and bounds, Bayesian networks, and compound decision theory. The Generative methods may include, without limitation, at least one of maximum likelihood and Bayesian parameter estimation, sufficient statistics, various common statistical distributions, dimensionality and computational complexity, principal components analysis, fisher linear discriminant, expectation maximization, sequential data, hidden Markov models, and non-parametric techniques including density estimation. The discriminative methods may include, without limitation, distance-based methods, nearest neighbor classification, metrics and tangent distance, fuzzy classification, linear discriminant functions (hyperplane geometry, gradient descent and perceptrons, minimum squared error procedures, and support vector machines), and artificial neural networks. The non-metric methods may include, without limitation, recognition with strings and string matching. The algorithm-independent machine learning techniques may include, without limitation, no-free lunch theorem, bias and variance, re-sampling for estimation, bagging and boosting, estimation of misclassification, and classifier combinations.

In certain embodiments, a remote device in communication with the media device may include one or more POM sensors. The remote device may relay POM information to the media device to facilitate control of the media device. For example, the remote device may be a wireless headset or earpiece. The media device may include an application that requires a yes or no input from the user. By nodding his head up and down (indicating "yes"), the user causes the earpieces position and orientation to change. This change in POM is then relayed wirelessly from the earpiece to the media device which then compares the sensor signal with its known database of motion patterns to determine that the user nodded "yes." If the user shook his head from side to side (indicating "no"), the media device would detect his head shaking. Any suitable wireless device interfacing with the media device may include this capability. The device may support any suitable wireless standard or interface such as, without limitation, CDMA, GSM, Bluetooth, wi-fi, 802.x, TDMA, and any like public or private wireless protocols.

The media device may support motion-based control and interfacing for numerous application including, without limitation, e-mail, texting, word processing, interface navigation, data searching, web surfing, database management, remote control systems, multimedia applications, or any application operating with a media device.

It will be apparent to those of ordinary skill in the art that methods involved in the present invention may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

It is understood that the various features, elements, or processes of the foregoing figures and description are interchangeable or combinable to realize or practice the invention describe herein. Those skilled in the art will appreciate that the invention can be practiced by other than the described embodiments, which are presented for purposes of illustration rather than of limitation, and the invention is limited only by the claims which follow.

What is claimed is:

1. A media device comprising:
    a proximity sensor for detecting that the media device is being gripped and generating an activation signal based on detecting that the media device is being gripped;
    a sensor for generating a sensor signal based on a position, orientation, and movement of the media device;
    a data store including a plurality of movement patterns of the media device, each movement pattern being associated with an application that may be executed by the media device;
    a processor for i) activating an application based on a received movement pattern and ii) controlling one or more operations of the activated application the media device based at least in part on the activation signal, the sensor signal, and one or more additional received movement patterns;
    a vibration data store storing a plurality of vibration patterns, wherein each of the vibration patterns is associated with one or more elements of the activated application;
    an audio data store storing a plurality of audio patterns, wherein each of the audio patterns is associated with one or more elements of the activated application;
    a vibration source for generating one of the one or more vibration patterns, wherein generating a vibration pattern occurs when the element associated with the vibration pattern is selected using one of the one or more additional received movement patterns; and
    an audio source for generating one or more audio patterns, wherein generating an audio pattern occurs when the element associated with the audio pattern is selected using one of the one or more additional received movement patterns.

2. The device of claim 1, wherein the processor controls the media device by accessing the plurality of movement patterns and by comparing the sensor signal with one or more of the movement patterns to determine the one or more operations of the activated application.

3. The device of claim 1, wherein the processor ignores detected changes in position, orientation, or movement of the media device that are not based on the user's hand movements or positioning as indicated by the proximity sensor.

4. The device of claim 1, wherein controlling the one or more operations of the activated application includes stepping through a list of elements associated with the activated application.

5. The device of claim 4, wherein the stepping occurs in an increment, the increment being proportional to an intensity of at least one of a rate of change in position, a rate of change in orientation, and a rate of movement.

6. The device of claim 1, wherein an operation of the activated application includes at least one of starting or launching one or more additional applications, stopping or ending one or more applications, selecting or de-selecting one or more elements, increasing or decreasing one or more settings, moving through a list of elements, initiating or ending a communications session, playing music or video, pausing music or video, and initiating or ending an audio or video recording session.

7. The device of claim 1, wherein the one or more elements includes at least one of a song, a video, a music file, an audio file, a video file, a photograph, a media file, an application icon, an activation icon, a control button, a data file, and contact data.

8. The device of claim 1, wherein the sensor includes at least one accelerometer.

9. The device of claim 1, wherein the sensor includes one or more of an accelerometer, gyroscope, compass, IR detector, sonic detector, altimeter, magnetic field detector, RF detector, GPS, light sensor, and doppler detector.

10. The device of claim 1, wherein generating a sensor signal is based on sensing a sequence of the position, orientation, and movement of the media device over a period of time.

11. The device of claim 1, further comprising an activation interface for receiving a user input to enable or disable the controlling of the operation of the media device based at least in part on the sensor signal.

12. The device of claim 1, wherein the media device includes at least one of a cellular telephone, a wireless communications device, a media player, an MP3 player, a video player, a PDA, and a portable computer.

13. The device of claim 1, further comprising an input interface for receiving the sensor signal and storing a movement pattern associated with the sensor signal.

14. A media device comprising:
- a proximity sensor for detecting whether the media device is being gripped and generating an activation signal based on detecting that the media device is being gripped;
- a pattern recognition unit for identifying movement patterns, the pattern recognition unit being activated based on a first received movement pattern and at least one other interaction with the media device;
- a vibration source for generating a plurality of vibration signals;
- an audio source for generating a plurality of audio signals;
- a vibration data store including a plurality of vibration patterns, wherein each of the vibration patterns is associated with a respective one of a plurality of operations of the media device;
- an audio data store including a plurality of audio patterns, wherein each of the audio patterns is associated with a respective one of the plurality of operations of the media device; and
- a processor for i) determining, when a first element is selected based on a second received movement pattern, a first operation of the media device that is associated with the selected first element, ii) identifying a vibration pattern associated with the first operation of the media device, iii) controlling the vibration source to generate a vibration signal associated with the vibration pattern, (iv) determining, when a second element is selected based on a third received movement pattern, a second operation of the media device, (v) identifying an audio pattern associated with the second operation of the media device, and (vi) controlling the audio source to generate an audio signal associated with the audio pattern.

15. The media device of claim 14, wherein the first and second elements, respectively, include at least one of a song, a video, a music file, an audio file, a video file, a photograph, a media file, an application icon, an activation icon, a control button, a data file, and contact data.

16. A media device comprising:
- a proximity sensor for detecting that the media device is being gripped and generating an activation signal based on detecting that the media device is being gripped;
- a pattern recognition unit for identifying movement patterns, the pattern recognition unit being activated based on a known movement pattern of the medial device;
- a vibration source for generating a plurality of vibration signals;
- an audio source for generating a plurality of audio signals;
- a data store including a plurality of combined vibration patterns and audio patterns, wherein each combined vibration pattern and audio pattern is associated with one of a plurality of operations of the media device, and
- a processor for i) determining, when an element is selected based on a received movement pattern, the operation of the media device that is associated with the selected element, ii) identifying a combined vibration pattern and audio pattern associated with the operation of the media device, and iii) controlling the vibration source and audio source to generate a vibration signal and audio signal associated with the combined vibration and audio pattern to indicate that the selected operation will be executed.

17. The media device of claim 16, wherein identifying is based at least in part on a statistical model.

18. The media device of claim 16, wherein the element includes at least one of a song, a video, a music file, an audio file, a video file, a photograph, a media file, an application icon, an activation icon, a control button, a data file, and contact data.

19. A media device comprising:
- a proximity sensor for detecting that the media device is being gripped and generating an activation signal based on detecting that the media device is being gripped;
- a movement pattern sensor for sensing a plurality of received movement patterns based on a sequence of changes in the position, orientation, and movement of the media device;
- a pattern recognition unit for receiving and identifying each of the received movement patterns;
- a vibration data store storing a plurality of vibration patterns, wherein each vibration pattern is associated with at least one element of an application being executed by the media device;
- an audio data store storing a plurality of audio patterns, wherein each audio pattern is associated with at least one element of the application being executed by the media device;
- a vibration source for generating the one or more vibration patterns, wherein generating a vibration pattern occurs when the element associated with the vibration pattern is selected based on a received movement of the media device; and
- an audio source for generating one or more audio patterns, wherein generating an audio pattern occurs when the element associated with the audio pattern is selected based on the received movement of the media device.

20. The media device of claim 19, wherein the element includes at least one of a song, a video, a music file, an audio file, a video file, a photograph, a media file, an application icon, an activation icon, a control button, a data file, and contact data.

21. A media device comprising:
- a proximity sensor for detecting that the media device is being held and generating an activation signal based on detecting that the media device is being held;
- a movement pattern sensor for sensing a plurality of movement patterns based on the position, orientation, and movement of the media device;
- a pattern recognition unit for receiving and identifying a plurality of received movement patterns;
- a communications application for i) providing user-based communications to and from the media device and ii) navigating through a contact list of entities associated with the user-based communications in response to a first received movement pattern and based in part on the activation signal;
- a vibration data store of one or more vibration patterns, each vibration pattern being associated with at least one entity in the contact list of entities;
- an audio data store of one or more audio patterns, each audio pattern being associated with at least one entity in the contact list of entities;
- a vibration source for generating the one or more vibration patterns when a respective entity in the contact list of entities is selected using the first received movement pattern; and
- an audio source for generating one or more audio patterns when the respective entity in the contact list of entities is selected using the first received movement pattern.

22. The media device of claim 21, wherein the communications application is executed when a second received movement pattern is recognized by the pattern recognition unit.

* * * * *